(12) United States Patent
Tomi

(10) Patent No.: US 7,399,427 B2
(45) Date of Patent: Jul. 15, 2008

(54) LIQUID CRYSTAL COMPOSITION AND LIQUID CRYSTAL DISPLAY ELEMENT

(75) Inventor: Yoshitaka Tomi, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 260 days.

(21) Appl. No.: 11/209,789

(22) Filed: Aug. 24, 2005

(65) Prior Publication Data

US 2006/0043334 A1    Mar. 2, 2006

(30) Foreign Application Priority Data

| Aug. 25, 2004 | (JP) | ............................. 2004-245703 |
| Dec. 16, 2004 | (JP) | ............................. 2004-364425 |

(51) Int. Cl.
   C09K 19/00    (2006.01)
   C09K 19/52    (2006.01)

(52) U.S. Cl. ...................... 252/299.01; 430/20; 428/1.1

(58) Field of Classification Search .................. 430/20; 252/299.01; 428/1.1
See application file for complete search history.

(56) References Cited

U.S. PATENT DOCUMENTS

| 6,045,878 | A | 4/2000 | Tarumi et al. |
| 6,174,457 | B1 * | 1/2001 | Kato et al. ............. 252/299.63 |
| 2002/0066887 | A1 | 6/2002 | Yanai et al. |
| 2003/0001138 | A1 | 1/2003 | Kubo et al. |
| 2004/0089844 | A1 | 5/2004 | Saito |

FOREIGN PATENT DOCUMENTS

| JP | 9059623 | 3/1997 |
| JP | 9071779 | 3/1997 |
| JP | 2003238960 | 8/2003 |

* cited by examiner

*Primary Examiner*—Geraldina Visconti
(74) *Attorney, Agent, or Firm*—Hogan & Hartson LLP

(57) ABSTRACT

Liquid crystal compositions are provided having a high "higher limit temperature" of a nematic phase, a low "lower limit temperature" of a nematic phase, small viscosity, suitable optical anisotropy, low threshold voltage and large specific resistance. The composition includes at least one compound selected from a group of compounds represented by formula (1) as a first component, at least one compound selected from a group of compounds represented by formula (2) as a second component, at least one compound selected from a group of compounds represented by formula (3) as a third component, and at least one compound selected from a group of compounds represented by formulae (4) and (5) as a fourth component:

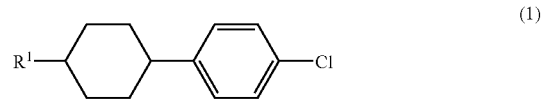

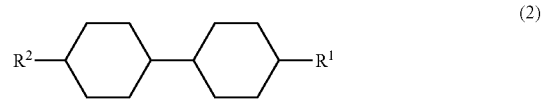

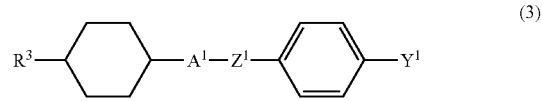

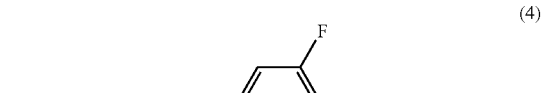

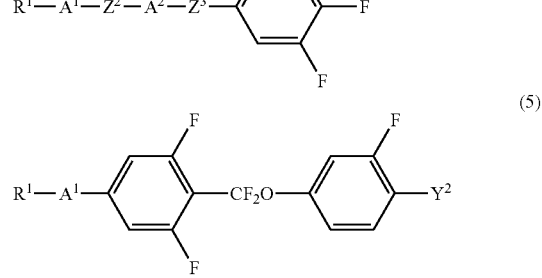

wherein $R^1$ is alkyl; $R^2$ is alkenyl; $R^3$ is alkyl or alkenyl; $A^1$ and $A^2$ are 1,4-phenylene, for example; $Z^1$, $Z^2$, and $Z^3$ are a single bond, for example; $Y^1$ and $Y^2$ are fluorine, for example.

37 Claims, No Drawings

LIQUID CRYSTAL COMPOSITION AND LIQUID CRYSTAL DISPLAY ELEMENT

BACKGROUND OF THE INVENTION

1. Field of the Invention

The invention relates to a liquid crystal composition suitable for use in an active matrix (AM) element, and an AM element including the composition.

2. Related Art

On a liquid crystal display element, classification based on an operating mode of liquid crystals includes phase change (PC), twisted nematic (TN), super twisted nematic (STN), optically compensated bend (OCB), in-plane switching (IPS), vertical alignment and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon and polycrystalline silicon. The latter is classified into a high temperature type and a low temperature type according to a production process. Classification based on a light source is a reflection type utilizing a natural light, a transmission type utilizing a backlight and a semi-transmission type utilizing both the natural light and the backlight.

These elements include a liquid crystal composition having suitable characteristics. General characteristics of the composition should be improved to obtain an AM element having good general characteristics. Table 1 below summarizes a relationship between the two general characteristics. The general characteristics of the composition will be explained further based on a commercially available AM element. A temperature range of a nematic phase relates to the temperature range in which the element can be used. A desirable range at a higher limit temperature of the nematic phase is 70° C. or more and a desirable range at a lower limit temperature is −20° C. or less. The viscosity of the composition relates to the response time of the element. A short response time is desirable for displaying a moving image. Accordingly, a small viscosity of the composition is desirable. A small viscosity at a low temperature is more desirable.

TABLE 1

General Characteristics of a Liquid Crystal Composition and an AM Element

| No. | General Characteristics of a Composition | General Characteristics of an AM Element |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Threshold voltage is low | Electric power consumption is small and a contrast ratio is large |
| 5 | Specific resistance is large | Voltage holding ratio is large and a contrast ratio is large |

Note
[1] A liquid crystal composition can be injected into a cell in a short time.

The optical anisotropy of the composition relates to the contrast ratio of the element. A product ($\Delta n \cdot d$) of the optical anisotropy ($\Delta n$) of the composition and the cell gap (d) of the element is designed to be approximately 0.45 micrometers to maximize the contrast ratio of the element. Accordingly, the optical anisotropy of the composition is in the range from 0.08 to 0.12. A low threshold voltage in the composition contributes to a small electric power consumption and a large contrast ratio of the element. Accordingly, a low threshold voltage is desirable. A large specific resistance of the composition contributes to a large voltage holding ratio and a large contrast ratio of the element. Accordingly, a composition having a large specific resistance in the initial stage at not only room temperature but also high temperatures is desirable. A composition having a large specific resistance at not only room temperature but also high temperatures even after it has been used for a long time is desirable.

A desirable AM element has such characteristics as a large usable temperature range, a short response time and a large contrast ratio. The response time is desirably shorter if even by 1 msec. Therefore, a composition having such characteristics as a high higher limit temperature of the nematic phase, a low lower limit temperature of the nematic phase, a small viscosity, a low threshold voltage and a large specific resistance is desirable. The conventional compositions and elements are disclosed in the following patent documents: JP H9-59623 A/1997; JP H9-71779 A/1997; JP H11-29771 A/1999 (U.S. Pat. No. 6,045,878 A); JP 2001-288470 A/2001 (U.S. Pat. No. 6,527,938 B2); JP 2002-285157 A/2002 (U.S. Pat. No. 6,682,784 B2); JP 2003-238960 A/2003; JP 2004-149691 A/2004 (U.S. Pat. No. 0089844 A1).

SUMMARY OF THE INVENTION

The invention relates to a liquid crystal composition, and a liquid crystal display element containing the same, including at least one compound selected from a group of compounds represented by formula (1) as a first component, at least one compound selected from a group of compounds represented by formula (2) as a second component, at least one compound selected from a group of compounds represented by formula (3) as a third component and at least one compound selected from a group of compounds represented by formula (4) and formula (5) as a fourth component:

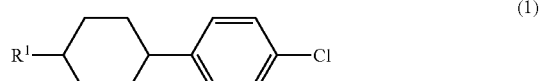

(1)

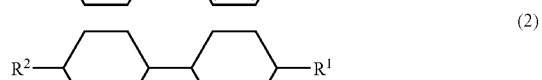

(2)

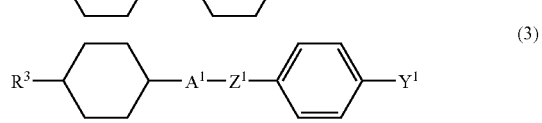

(3)

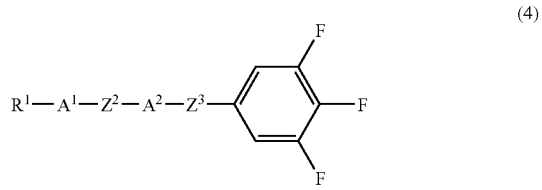

(4)

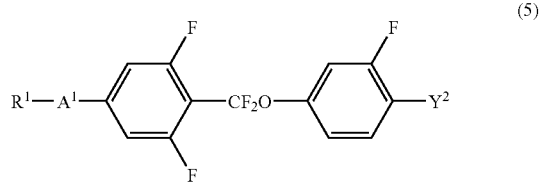

(5)

wherein $R^1$ is alkyl; $R^2$ is alkenyl; $R^3$ is alkyl or alkenyl; $A^1$ is 1,4-cyclohexylene or 1,4-phenylene; $A^2$ is 1,4-phenylene or 2,6-difluoro-1,4-phenylene; $Z^1$ is a single bond or —COO—; $Z^2$ is a single bond or —(CH$_2$)$_2$—; $Z^3$ is a single bond, —COO— or —CF$_2$O—; $Y^1$ is alkyl, fluorine, chlorine or —OCF$_3$; and $Y^2$ is fluorine or —OCF$_3$.

The invention also has a liquid crystal display element including the liquid crystal composition described above.

DETAILED DESCRIPTION OF THE INVENTION

Terms used in the specification and claims are defined as follows: The liquid crystal composition of the invention or the liquid crystal display element of the invention may occasionally be abbreviated as "the composition" or "the element," respectively. A liquid crystal display element is a general term for a liquid crystal display panel and a liquid crystal display module. Liquid crystalline compounds are a main component of a liquid crystal composition. A liquid crystalline compound is a general term for a compound having a liquid crystal phase such as a nematic phase at 25° C., a smectic phase at 25° C. and so forth, and a general term for a compound having no liquid crystal phase at 25° C. and being useful as a component of the composition. Optically active compounds are not included in the liquid crystalline compound. At least one compound selected from a group of compounds represented by formula (1) may be abbreviated as "the compound (1)." The compounds represented by any other formula may also be abbreviated in the same manner.

A higher limit temperature of a nematic phase may be abbreviated as "a higher limit temperature." A lower limit temperature of a nematic phase may be abbreviated to "a lower limit temperature." "A specific resistance is large" means that a composition has a large specific resistance at not only room temperature but also high temperatures at the initial stage, and the composition has a large specific resistance at not only room temperature but also high temperatures even after it has been used for a long time. "A voltage holding ratio is large" means that an element has a large voltage holding ratio at not only room temperature but also high temperatures at the initial stage and the element has a large voltage holding ratio at not only room temperature but also high temperatures even after it has been used for a long time. When characteristics such as optical anisotropy and so forth are explained, values measured by means of the method described in the Examples are used. The content (percentage) of a component compound in a composition means the percentage by weight (% by weight) based on the total weight of the composition.

An advantage of the invention is to provide a liquid crystal composition that satisfies many characteristics among the characteristics such as a high higher limit temperature of the nematic phase, a low lower limit temperature of the nematic phase, a small viscosity, a suitable optical anisotropy, a low threshold voltage and a large specific resistance. One aspect of the invention is also to provide a liquid crystal composition properly balanced regarding many characteristics. Another aspect of the invention is also to provide a liquid crystal display element including such a composition. A further aspect of the invention is to provide an AM element including a composition with a small viscosity, an optical anisotropy ranging from 0.08 to 0.12 and a low threshold voltage, having a short response time and a large voltage holding ratio. Among these, an important characteristic feature is a short response time.

The invention includes the following.

1. A liquid crystal composition including at least one compound selected from a group of compounds represented by formula (1) as a first component, at least one compound selected from a group of compounds represented by formula (2) as a second component, at least one compound selected from a group of compounds represented by formula (3) as a third component, and at least one compound selected from a group of compounds represented by formula (4) and formula (5) as a fourth component:

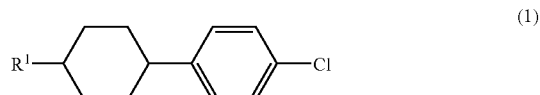

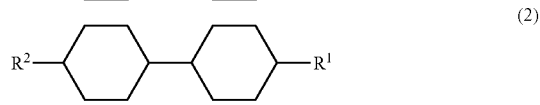

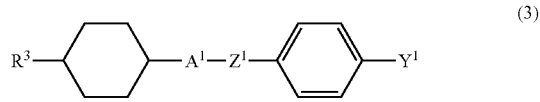

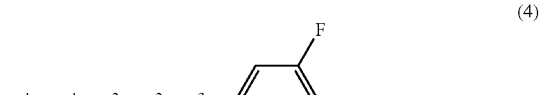

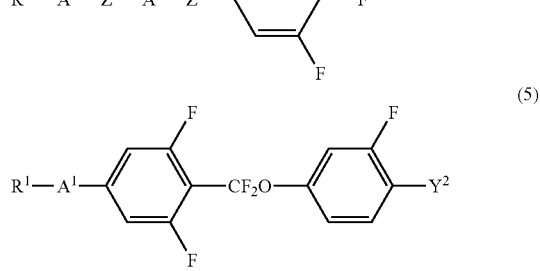

wherein $R^1$ is alkyl; $R^2$ is alkenyl; $R^3$ is alkyl or alkenyl; $A^1$ is 1,4-cyclohexylene or 1,4-phenylene; $A^2$ is 1,4-phenylene or 2,6-difluoro-1,4-phenylene; $Z^1$ is a single bond or —COO—; $Z^2$ is a single bond or —(CH$_2$)$_2$—; $Z^3$ is a single bond, —COO— or —CF$_2$O—; $Y^1$ is alkyl, fluorine, chlorine or —OCF$_3$; and $Y^2$ is fluorine or —OCF$_3$.

2. The liquid crystal composition according to item 1, wherein the fourth component is at least one compound selected from the group of compounds represented by formula (4).

3. The liquid crystal composition according to item 1 or 2, wherein the first component is in the range from approximately 5% to approximately 30% by weight, the second component is in the range from approximately 20% to approximately 55% by weight, the third component is in the range from approximately 10% to approximately 55% by weight, the fourth component is in the range from approximately 5% to approximately 40% by weight and wherein each range is based on the total weight of the liquid crystal composition.

4. A liquid crystal composition including at least one compound selected from a group of compounds represented by formula (1) as a first component, at least one compound selected from a group of compounds represented by formula (2) as a second component, at least one compound selected from a group of compounds represented by formula (3-1) and formula (3-2) as a third component, and at least one compound selected from a group of compounds represented by formula (4-1) as a fourth component:

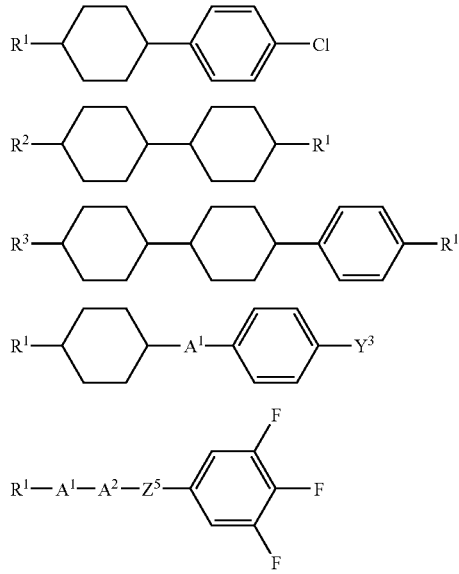

(1)

(2)

(3-1)

(3-2)

(4-1)

wherein $R^1$ is alkyl; $R^2$ is alkenyl; $R^3$ is alkyl or alkenyl; $A^1$ is 1,4-cyclohexylene or 1,4-phenylene; $A^2$ is 1,4-phenylene or 2,6-difluoro-1,4-phenylene; $Z^5$ is a single bond or —$CF_2O$—; and $Y^3$ is fluorine or chlorine.

5. The liquid crystal composition according to item 4, wherein the third component is at least one compound selected from the group of compounds represented by formula (3-1).

6. The liquid crystal composition according to item 4, wherein the third component is at least one compound selected from the group of compounds represented by formula (3-1) and at least one compound selected from the group of compounds represented by formula (3-2).

7. The liquid crystal composition according to one of items 4 to 6, wherein the first component is in the range from approximately 5% to approximately 30% by weight, the second component is in the range from approximately 20% to approximately 55% by weight, the third component is in the range from approximately 10 to approximately 55% by weight, the fourth component is in the range from approximately 5% to approximately 40% by weight and wherein each range is based on the total weight of the liquid crystal composition.

8. A liquid crystal composition including at least one compound selected from a group of compounds represented by formula (1) as a first component, at least one compound selected from a group of compounds represented by formula (2) as a second component, at least one compound selected from a group of compounds represented by formula (3-1) and formula (3-2) as a third component, and at least one compound selected from a group of compounds represented by formula (4-1-1) and formula (4-1-2) as a fourth component:

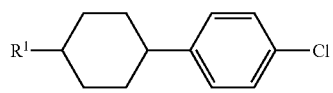

(1)

-continued

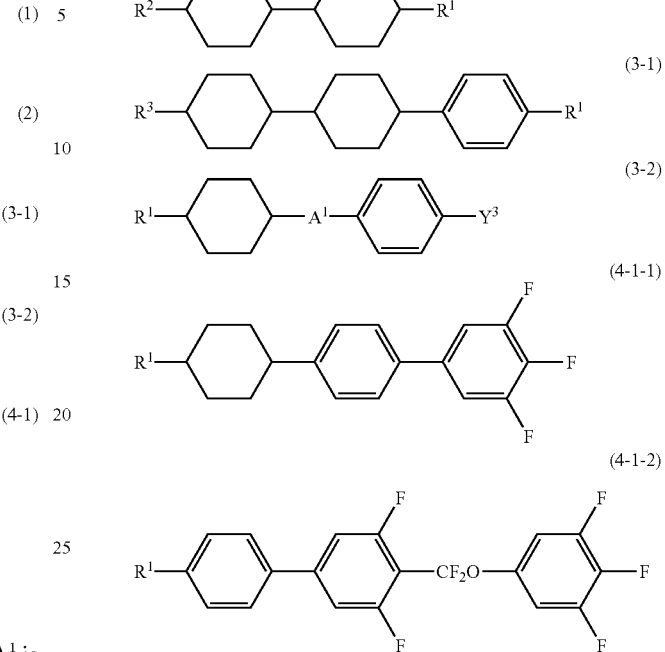

(2)

(3-1)

(3-2)

(4-1-1)

(4-1-2)

wherein $R^1$ is alkyl; $R^2$ is alkenyl; $R^3$ is alkyl or alkenyl; $A^1$ is 1,4-cyclohexylene or 1,4-phenylene; and $Y^3$ is fluorine or chlorine.

9. The liquid crystal composition according to item 8, wherein the third component is at least one compound selected from the group of compounds represented by formula (3-1).

10. The liquid crystal composition according to item 8, wherein the third component is at least one compound selected from the group of compounds represented by formula (3-1) and at least one compound selected from the group of compounds represented by formula (3-2).

11. The liquid crystal composition according to one of items 8 to 10, wherein the fourth component is at least one compound selected from the group of compounds represented by formula (4-1-2).

12. The liquid crystal composition according to one of items 8 to 10, wherein the fourth component is at least one compound selected from the group of compounds represented by formula (4-1-1) and at least one compound selected from a the group of compounds represented by formula (4-1-2).

13. The liquid crystal composition according to one of items 8 to 12, wherein the first component is in the range from approximately 5% to approximately 30% by weight, the second component is in the range from approximately 20% to approximately 55% by weight, the third component is in the range from approximately 10% to approximately 55% by weight, the fourth component is in the range from approximately 5% to approximately 40% by weight and wherein each range is based on the total weight of the liquid crystal composition.

14. The liquid crystal composition according to one of items 1 to 13, wherein the liquid crystal composition further comprises at least one compound selected from the group of compounds represented by formula (6), formula (7) and formula (8) as a fifth component:

(6)
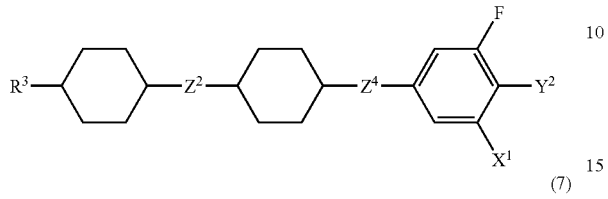

(7)
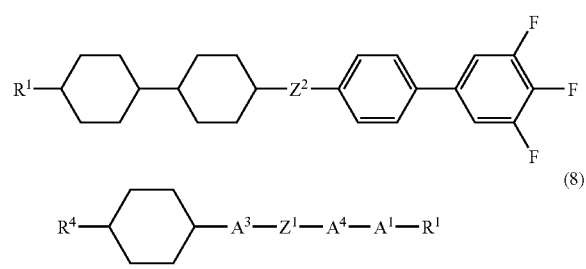

(8)

wherein $R^1$ is alkyl; $R^3$ is alkyl or alkenyl; $R^4$ is alkyl or alkoxymethyl; $A^1$ is 1,4-cyclohexylene or 1,4-phenylene; $A^3$ is 1,4-cyclohexylene, 1,4-phenylene or 2-fluoro-1,4-phenylene; $A^4$ is 1,4-phenylne or 2-fluoro-1,4-phenylene; $Z^1$ is a single bond or —COO—; $Z^2$ is a single bond or —(CH$_2$)$_2$—; $Z^4$ is a single bond, —(CH$_2$)$_2$—, —COO— or —CF$_2$O—; $X^1$ is hydrogen or fluorine; and $Y^2$ is fluorine or —OCF$_3$.

15. The liquid crystal composition according to one of items 1 to 13, wherein the liquid crystal composition further comprises at least one compound selected from a group of compounds represented by formula (6-1), formula (7-1) and formula (8-1):

(6-1)
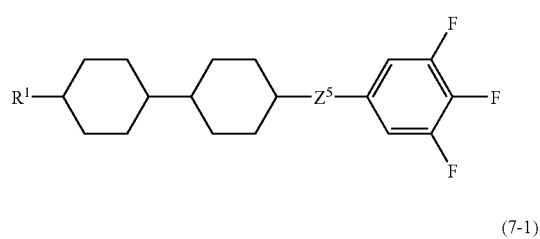

(7-1)
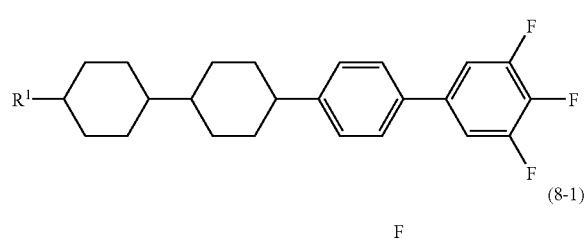

(8-1)
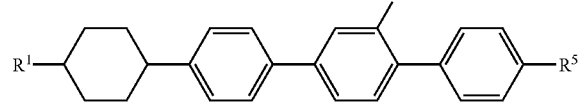

wherein $R^1$ and $R^5$ are independently alkyl; and $Z^5$ is a single bond or —CF$_2$O—.

16. The liquid crystal composition according to item 14 or 15, wherein the fifth component is in the range from approximately 1% to approximately 30% by weight based on the total weight of the liquid crystal composition.

17. The liquid crystal composition according to one of items 1 to 16, wherein the liquid crystal composition further comprises an antioxidant.

18. The liquid crystal composition according to item 17, wherein the antioxidant is at least one compound selected from a group of compounds represented by formula (9):

(9)
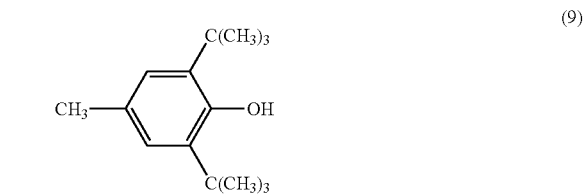

19. The liquid crystal composition according to item 17, wherein the antioxidant is at least one compound selected from a group of compounds represented by formula (12):

(12)
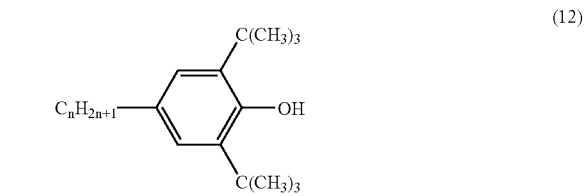

wherein n is an integer of 2 to 9.

20. The liquid crystal composition according to one of items 17 to 19, wherein the antioxidant is in the range from approximately 50 ppm to approximately 600 ppm based on the total weight of the liquid crystal composition.

21. A liquid crystal display element comprising the liquid crystal composition according to one of items 1 to 20.

The invention also includes the following: (1) the aforementioned composition having an optical anisotropy ranging from approximately 0.08 to approximately 0.12; (2) the aforementioned composition having a higher limit temperature of the nematic phase of approximately 70° C. or more and a lower limit temperature of approximately −20° C. or less; (3) the aforementioned composition containing an optically active compound; (4) an AM element containing the aforementioned composition; (5) an element containing the aforementioned composition and having a TN, OCB or IPS mode; (6) a transmission element containing the aforementioned composition; (7) use of the aforementioned composition as a composition having a nematic phase; and (8) use of the aforementioned composition as an optically active composition by adding an optically active compound as.

The advantages of the invention have been described hereinabove. The important advantage among them is a short response time. A composition having a small viscosity is desirable for reducing the response time. Accordingly, the compound (2) is selected as an essential component. The compound (2) is a bicyclohexane having alkenyl and alkyl and has a small viscosity. A bicyclohexane having two alkyls is analogous to the compound (2). The analogous compound has such a small viscosity that is equivalent to the compound (2) and has an effect of reducing the response time of the element. A large ratio of the analogous compound in the composition is effective for reducing the response time, but the large ratio thereof lowers the lower limit temperature of the composition. The inventors have found that the compound (2) has such a nature that the compound less lowers the lower limit temperature. Owing to the nature, the compound (2) can be mixed in a larger ratio in the composition than the analogous compound. The aforementioned finding is one of the important points of the invention.

The ratio of the compound (2) is desirably large for lowering the viscosity of the composition, but the large ratio thereof lowers the lower limit temperature of the composition. It has been found that the compound (1) is effective for preventing the phenomenon from occurring. The combination of the compound (1) and the compound (2) is significantly effective for obtaining the composition having a small viscosity owing to the small viscosity of the compound (1). This is another one of the important points of the invention.

Table 2 below summarizes a relationship between the ratio of the compound (2) in the composition and the lower limit temperature. For reference, a relationship between the ratio of the analogous compound of the compound (2) in the composition and the lower limit temperature is also shown. A compound as a specimen is mixed with a mother liquid crystal B, and the mixture is stored at −20° C. for 30 days and then observed for change in liquid crystal phase. The specific experimentation method will be described in the EXAMPLE section later. In Table 2, symbol S means that the liquid crystal phase stays at the nematic phase, and symbol T means that the liquid crystal is transferred from the nematic phase to crystals (or a smectic phase). A composition containing the compound (2) in a ratio of 20% by weight stays at the nematic phase. The composition has a lower limit temperature of −20° C. A composition containing the analogous compound in a ratio of 10% by weight stays at the nematic phase. The composition has a lower limit temperature of −20° C. However, a compound containing the analogous compound in a ratio of 15% by weight is transferred to a crystal (or a smectic phase). The composition has a lower limit temperature higher than −20° C. It is understood from the results that the compound (2) can be mixed in a larger ratio than the analogous compound thereof.

having a large dielectric anisotropy, the compound (5) having a large dielectric anisotropy and so forth are combined. As a result, such a compound can be obtained that is properly balanced regarding characteristics such as a high higher limit temperature, a low lower limit temperature, a small viscosity, a short response time, a suitable optical anisotropy and a low threshold voltage.

The composition of the invention will be explained in the following order. First, the constitution of component compounds in the composition will be explained. Second, the main characteristics of the component compounds and the main effects of the compounds influencing the composition will be explained. Third, suitable ratios of the component compounds and their basis will be explained. Fourth, desirable embodiments of the component compounds will be explained. Fifth, concrete examples of the component compounds will be shown. Sixth, the preparation methods of the component compounds will be explained. Last, utilization of the composition will be explained.

First, the constitution of components in the composition will be explained. The composition of the invention is classified into composition A and composition B. The composition A may further include other compounds. The "other compounds" include a liquid crystalline compound, an additive, an impurity and so forth. The liquid crystalline compound is different from the compounds (1) to (8). The liquid crystalline compound is mixed to the composition for the purpose of adjusting the characteristics of the composition. The additive includes an optically active compound, a coloring matter, an antioxidant and so forth. The optically active compound is mixed to the composition for the purpose of giving a twist angle by means of inducing a helical structure. The coloring matter is mixed to the composition to adjust the element of a guest host (GH) mode. The antioxidant is mixed to the composition for the purpose of preventing the specific resistance from lowering by heating in the air or of attaining a large voltage holding ratio at not only room temperature but also high temperatures even after it has been used for a long time. The antioxidant includes compounds represented by formula (9). The impurity includes compounds that are mixed during the production process of the compounds and so forth.

In one embodiment of the invention, the composition B essentially consists of the compounds selected from the compounds (1) to (5) or the compounds (1) to (8). The term "essentially" means that the composition does not include a liquid crystalline compound which is different from the compounds (1) to (8). The term "essentially" also means that the composition may further include an additive, an impurity and so forth. The components of the composition B is fewer in

TABLE 2

Ratio of Compound and Lower Limit Temperature

| Ratio of Compound (% by weight) | CH₂=CH—⟨cyclohexane⟩—⟨cyclohexane⟩—C₃H₇ | C₂H₅—⟨cyclohexane⟩—⟨cyclohexane⟩—C₃H₇ |
|---|---|---|
| 1 | S | S |
| 3 | S | S |
| 5 | S | S |
| 10 | S | S |
| 15 | S | T |
| 20 | S | T |

Based on the aforementioned findings, the compound (3) having a high higher limit temperature, the compound (4)

comparison with those of the composition A. The composition B is preferable to the composition A from the viewpoint of costs. The composition A is preferable to the composition B, because the physical properties of the composition A can be further adjusted by mixing with other liquid crystalline compounds.

Examples of the liquid crystalline compound which is different from the compounds (1) to (8) include a compound having a cyano group. The compound has such a partial structure as those shown in formulae (10-1) to (10-3). The liquid crystalline compound may be contained in a composition used in an element having such a mode as the IPS mode, but the compound lowers the specific resistance of the composition. Accordingly, it is not preferred to add the compound to a composition used in such an element as an AM-TFT element. Examples of the optically active compound include those represented by formulae (11-1) to (11-4).

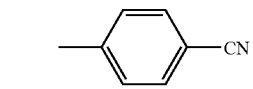
(10-1)

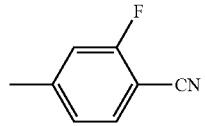
(10-2)

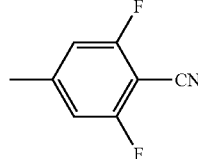
(10-3)

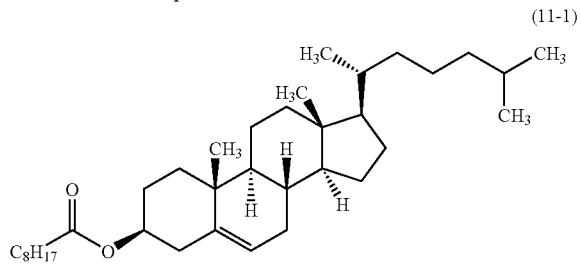
(11-1)

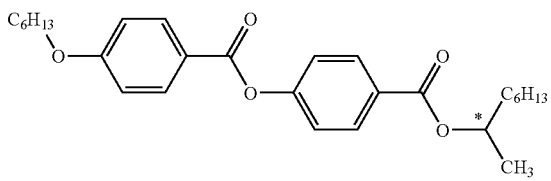

Second, the main characteristics of the component compounds and the main effects of the compounds influencing the composition will be explained. The main characteristics of the compounds are summarized in Table 3. In Table 3, the letter L represents large or high, the letter M represents a middle degree and the letter S represents small or low. The number 0 indicates that the dielectric anisotropy is nearly zero (or very small).

TABLE 3

| | First component | Second component | Third component | Fourth component | Fifth component | | |
|---|---|---|---|---|---|---|---|
| | Compound (1) | Compound (2) | Compound (3) | Compounds (4) & (5) | Compound (6) | Compound (7) | Compound (8) |
| Higher limit temperature | S | S | L | S–M | M | L | L |
| Viscosity | S | S | M | L | M | L | M |
| Optical anisotropy | S | S | M | M | S | L | L |
| Dielectric anisotropy | S | 0 | 0, S | M–L | M | M | 0 |
| Specific resistance | L | L | L | L | L | L | L |

The characteristic feature of the composition resides in the combination of the compounds (1) to (5). The compound (1) has a large effect of lowering the lower limit temperature of the composition. The compound (2) has a large effect of lowering the viscosity of the composition. The compound (3) has a large effect of increasing the higher limit temperature of the composition. The compound (4) or (5) has a large effect of increasing the dielectric anisotropy of the composition. Table 4 summarizes dielectric anisotropy of the representative component compounds. It is understood from Table 4 that the low threshold voltage for driving the element mainly depends on the compound (4) or (5). The expressions of the compounds are made according to the method of description shown in Table 5.

TABLE 4

Dielectric Anisotropy of Compounds

| Component | No. of compound | Compound | Dielectric anisotropy |
|---|---|---|---|
| First component | (1) | 3-HB—CL | 5.0 |
| Second component | (2) | V—HH-5 | −1.3 |
| Third component | (3-1-1) | 3-HHB-1 | 1.7 |
|  | (3-2-2) | 5-HHB—CL | 5.0 |
| Fourth component | (4-1-1) | 3-HBB(F,F)—F | 11.7 |
|  | (4-1-2) | 3-BB(F,F)XB(F,F)—F | 27.7 |
| Fifth component | (6-1-8) | 3-HHB(F,F)—F | 11.0 |
|  | (6-1-12) | 3-HHXB(F,F)—F | 12.7 |
|  | (7-1-1) | 3-HHBB(F,F)—F | 13.0 |
|  | (8-1-2) | 1O1-HBBH-5 | 3.0 |
|  | (8-1-4) | 5-HBB(F)B-2 | 3.9 |

The main effects of the component compounds on the composition are as follows. The compound (1) decreases the higher limit temperature, decreases the viscosity, decreases the optical anisotropy and increases the threshold voltage in the composition. The lower limit temperature can be prevented from increasing by mixing the compound (1). The compound (2) decreases the higher limit temperature, decreases the viscosity, decreases the optical anisotropy and increases the threshold voltage in the composition. The compound (3) increases the higher limit temperature, decreases the viscosity, increases the optical anisotropy and increases the threshold voltage in the composition. The compound (4) or the compound (5) decreases the higher limit temperature, increases the viscosity, increases the optical anisotropy and decreases the threshold voltage in the composition. Upon adjusting the characteristics of the composition, the compound (6), the compound (7) and/or the compound (8) are mixed. The compound (6) decreases the optical anisotropy and simultaneously decreases the threshold voltage.

The compound (3) includes a compound (3-1) and a compound (3-2). The compound (3-1) particularly decreases the viscosity. The compound (3-2) particularly decreases the lower limit temperature. The compound (4) includes a compound (4-1), and the compound (4-1) includes a compound (4-1-1) and a compound (4-1-2). The compound (4-1-1) decreases the threshold voltage and simultaneously decreases the viscosity. The compound (4-1-2) particularly decreases the threshold voltage. The compound (7) increases the higher limit temperature and simultaneously decreases the threshold voltage. The compound (8) particularly increases the higher limit temperature. The compound (6) includes a compound (6-1), the compound (7) includes a compound (7-1), and the compound (8) includes a compound (8-1).

Third, suitable ratios of the component compounds and their basis will be explained. A desirable ratio of the first component is approximately 5% by weight or more for preventing the lower limit temperature from increasing and is approximately 30% by weight or less for increasing the higher limit temperature. A more desirable ratio thereof is from approximately 5% to approximately 20% by weight. The higher limit of the ratio is suitable for a composition having a lower lower limit temperature and a higher higher limit temperature.

A desirable ratio of the second composition is approximately 20% by weight or more for decreasing the viscosity of the composition and is approximately 55% by weight or less for further decreasing the lower limit temperature. A more desirable ratio thereof is from approximately 26% to approximately 50% by weight. The lower limit of the ratio is suitable for a composition having a smaller viscosity and a smaller optical anisotropy. The higher limit of the ratio is suitable for a composition having a lower lower limit temperature.

A desirable ratio of the third composition is approximately 10% by weight or more for increasing the higher limit temperature of the composition and is approximately 55% by weight or less for further decreasing the lower limit temperature. A more desirable ratio thereof is from approximately 15% to approximately 45% by weight. The lower limit of the ratio is suitable for a composition having a higher higher limit temperature. The higher limit of the ratio is suitable for a composition having a lower higher limit temperature.

A desirable ratio of the fourth composition is approximately 5% by weight or more for decreasing the threshold voltage of the composition and is approximately 40% by weight or less for further decreasing the lower limit temperature. A more desirable ratio thereof is from approximately 10% to approximately 30% by weight. The lower limit of the ratio is suitable for a composition having a lower threshold voltage. The higher limit of the ratio is suitable for a composition having a smaller viscosity.

The case where the fifth component is mixed will be explained. A desirable ratio of the fifth component is approximately 1% by weight or more for adjusting the higher limit temperature, the threshold voltage or the optical anisotropy in the composition and is approximately 30% by weight or less for further decreasing the lower limit temperature. A more desirable ratio thereof is from approximately 1% to approximately 20% by weight. The higher limit of the ratio is suitable for a composition having a lower lower limit temperature or a composition having a smaller viscosity.

There is a measure of adding an antioxidant with the composition for preventing the specific resistance from decreasing upon heating in the air or for attaining a large voltage holding ratio at not only room temperature but also high temperature after it has been used for a long time. In the case where an antioxidant is added to the composition, a desirable addition amount of the antioxidant is approximately 50 ppm or more for exerting the effect thereof and is approximately 600 ppm or less for increasing the higher limit temperature of the composition and for decreasing the lower limit temperature thereof. A more desirable ratio thereof is from approximately 100 to approximately 300 ppm. The addition amount herein is a ratio based on the total weight of the liquid crystal composition.

In the composition A, the ratio of the compounds (1) to (5) or the compounds (1) to (8) occupied in the composition is desirably approximately 70% by weight or more for obtaining excellent characteristics of the invention. The ratio is more desirably approximately 90% or more.

Fourth, desirable embodiments of the component compounds will be explained. The symbol $R^1$ is used for many compounds in the formulae for the component compounds.

$R^1$ may be identical or different in these compounds. For example, there is a case that $R^1$ of the compound (1) is ethyl and $R^1$ of the compound (2) is ethyl. There is also a case that $R^1$ of the compound (1) is ethyl and $R^1$ of the compound (2) is propyl. This rule is also applicable to the symbols $R^2$, $R^3$, $R^4$, $R^5$, $R^6$, $A^1$, $A^2$, $A^3$, $A^4$, $Z^1$, $Z^2$, $Z^3$, $Z^4$, $Z^5$, $X^1$, $Y^1$, $Y^2$, $Y^3$ and n.

Desirable $R^1$ and $R^5$ are independently alkyl of 1 to 10 carbons. Desirable $R^2$ is alkenyl of 2 to 10 carbons. Desirable $R^3$ is alkyl of 1 to 10 carbon or alkoxy of 1 to 10 carbons or alkenyl of 2 to 10 carbons. Desirable $R^4$ is alkyl of 1 to 10 carbon or alkoxymethyl of 2 to 10 carbons. Desirable $Y^1$ is alkyl of 1 to 10 carbons, fluorine, chlorine or —$OCF_3$.

Desirable alkyl are methyl, ethyl, propyl, butyl, pentyl, hexyl, heptyl or octyl. In consideration of the liquid crystal phase and the viscosity of the compound, more desirable alkyl is ethyl, propyl, butyl, pentyl or heptyl. Desirable alkyl in the compound (1) are propyl, pentyl or heptyl, more desirable alkyl are propyl or pentyl, and a particularly desirable alkyl is propyl, from the viewpoint of further decreasing the viscosity and further decreasing the lower limit temperature in the composition.

Desirable alkenyl are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. In consideration of the liquid crystal phase and the viscosity of the compound, more desirable alkenyl are vinyl, 1-propenyl, 3-butenyl, or 3-pentenyl. A desirable configuration of —CH=CH— in these alkenyl depends on the position of a double bond. Trans is desirable in the alkenyl such as 1-propenyl, 1-butenyl, 1-pentenyl, 1-hexenyl, 3-pentenyl and 3-hexenyl. Cis is desirable in the alkenyl such as 2-butenyl, 2-pentenyl and 2-hexenyl. These positions of the double bond are a result of consideration of the liquid crystal phase, the viscosity and so forth of the compound.

Desirable alkoxymethyl are methoxymethyl, ethoxymethyl, propoxymethyl, butoxymethyl or pentyloxymethyl. In consideration of the liquid crystal phase and the viscosity of the compound, a more desirable alkoxymethyl is methoxymethyl.

A linear structure is desirable in alkyl, alkenyl and alkoxymethyl in consideration of the viscosity of the compound.

$A^1$ is 1,4-cyclohexylene or 1,4-phenylene. $A^2$ is 1,4-phenylene or 2,6-difluoro-1,4-phenylene. $A^3$ is 1,4-cyclohexylene, 1,4-phenylene or 2-fluoro-1,4-phenylene. $A^4$ is 1,4-phenylene or 2-fluoro-1,4-phenylene. A configuration of 1,4-cyclohexylene is desirably trans rather than cis in consideration of the liquid crystal phase of the compound. A fluoro group in 2,6-difluoro-1,4-phenylene is desirably positioned on the right side for increasing the dielectric anisotropy of the compound. For example, see the compound (4-1-2) and so forth. A fluoro group in 2-fluoro-1,4-phenylene is desirably positioned on the right side for decreasing the lower limit temperature of the composition. For example, see the compound (8-1-4) and so forth.

$Z^1$ is a single bond or —COO—. In consideration of the viscosity and so forth of the compound, desirable $Z^1$ is a single bond. $Z^2$ is a single bond or —$(CH_2)_2$—. In consideration of the viscosity and so forth of the compound, desirable $Z^2$ is a single bond. $Z^3$ is a single bond, —COO— or —$CF_2O$—. In consideration of the viscosity of the compound, desirable $Z^3$ is a single bond, and in consideration of the dielectric anisotropy of the compound, desirable $Z^3$ is —$CF_2O$—. $Z^4$ is a single bond, —$(CH_2)_2$—, —COO— or —$CF_2O$—. In consideration of the viscosity of the compound, desirable $Z^4$ is a single bond, and in consideration of the dielectric anisotropy of the compound, desirable $Z^4$ is —$CF_2O$—. $Z^5$ is a single bond or —$CF_2O$—. In consideration of the viscosity of the compound, desirable $Z^5$ is a single bond, and in consideration of the dielectric anisotropy of the compound, desirable $Z^5$ is —$CF_2O$—. In $Z^1$, $Z^2$, $Z^3$, $Z^4$ and $Z^5$, the direction of the bonded group is fixed. See the compound (3-2-4) and so forth for —COO—. See the compound (4-1-2) and so forth for —$CF_2O$—.

Fifth, concrete examples of the component compounds will be shown. In the following desirable compounds, $R^1$ and $R^5$ are independently alkyl of 1 to 10 carbons, $R^2$ is alkenyl of 2 to 10 carbons, and $R^3$ is alkenyl of 1 to 10 carbons or alkenyl of 2 to 10 carbons. $R^6$ is alkyl of 2 to 10 carbons. More desirable alkyl and alkenyl have been described hereinabove. In the desirable compounds, the configuration of 1,4-cyclohexylene is desirably trans rather than cis in consideration of the liquid crystal phase of the compound.

Desirable alkyl in the compound (1) are propyl, pentyl or heptyl from the viewpoint of further decreasing the viscosity of the composition and further decreasing the lower limit temperature thereof. More desirable alkyl are propyl or pentyl, and a particularly desirable alkyl is propyl. In consideration of the viscosity and the liquid crystal phase, a desirable combination of $R^1$ and $R^2$ in the compound (2) is as follows. Compounds where $R^1$ is propyl and $R^2$ is vinyl, $R^1$ is butyl and $R^2$ is vinyl, $R^1$ is pentyl and $R^2$ is vinyl, and $R^1$ is propyl and $R^2$ is 1-propenyl, are desirable.

The desirable compound (3) are the compounds (3-1-1) to (3-2-5). Desirable compound (4) are the compounds (4-1-1) to (4-1-6). Desirable compound (5) are the compounds (5-1-1) to (5-1-4). The desirable compound (6) is the compounds (6-1-1) to (6-1-12). Desirable compound (7) are the compounds (7-1-1) and (7-1-2). Desirable compound (8) are the compounds (8-1-1) to (8-1-5). $R^3$ in these compounds is desirably alkyl from the viewpoint of decreasing the production cost.

More desirable compound (3) are the compounds (3-1-1), (3-2-1), (3-2-2) and (3-2-5) from the viewpoint of decreasing the viscosity or further decreasing the lower limit temperature in the composition. More desirable compound (4) are the compounds (4-1-1), (4-1-2), (4-1-5) and (4-1-6) from the viewpoint of decreasing the viscosity or decreasing the threshold voltage in the composition. The particularly desirable compound (4) are the compounds (4-1-1) and (4-1-2) from the viewpoint of further decreasing the viscosity or further decreasing the threshold voltage in the composition. More desirable compound (5) are the compounds (5-1-3) and (5-1-4) from the viewpoint of decreasing the viscosity or decreasing the threshold voltage in the composition. Desirable compound (6) are the compounds (6-1-8) and (6-1-12) from the viewpoint of decreasing the viscosity or decreasing the threshold voltage in the composition. $R^3$ in these compounds is desirably alkyl from the viewpoint of decreasing the production cost. The desirable compound (7) is the compound (7-1-1) from the viewpoint of decreasing the viscosity of the composition. The desirable compound (8) is the compound (8-1-4) from the viewpoint of increasing the optical anisotropy of the composition.

The compounds (3-1-1) and (3-1-2), as the desirable compounds of the compound (3), are also desirable compounds of the compound (3-1). The compounds (3-2-1), (3-2-2) and (3-2-5) as the desirable compounds of the compound (3) are also desirable compounds of the compound (3-2). The desirable compounds and the particularly desirable compounds of the compound (4) are also the desirable compounds and the particularly desirable compounds of the compound (4-1), respectively. In the case where $R^3$ in the desirable compounds of the compound (6) is alkyl, they are the desirable compounds of the compound (6-1). The desirable compounds of the compounds (7) are also the desirable compounds of the compound (7-1). The desirable compounds of the compounds (8) are also the desirable compounds of the compound (8-1).

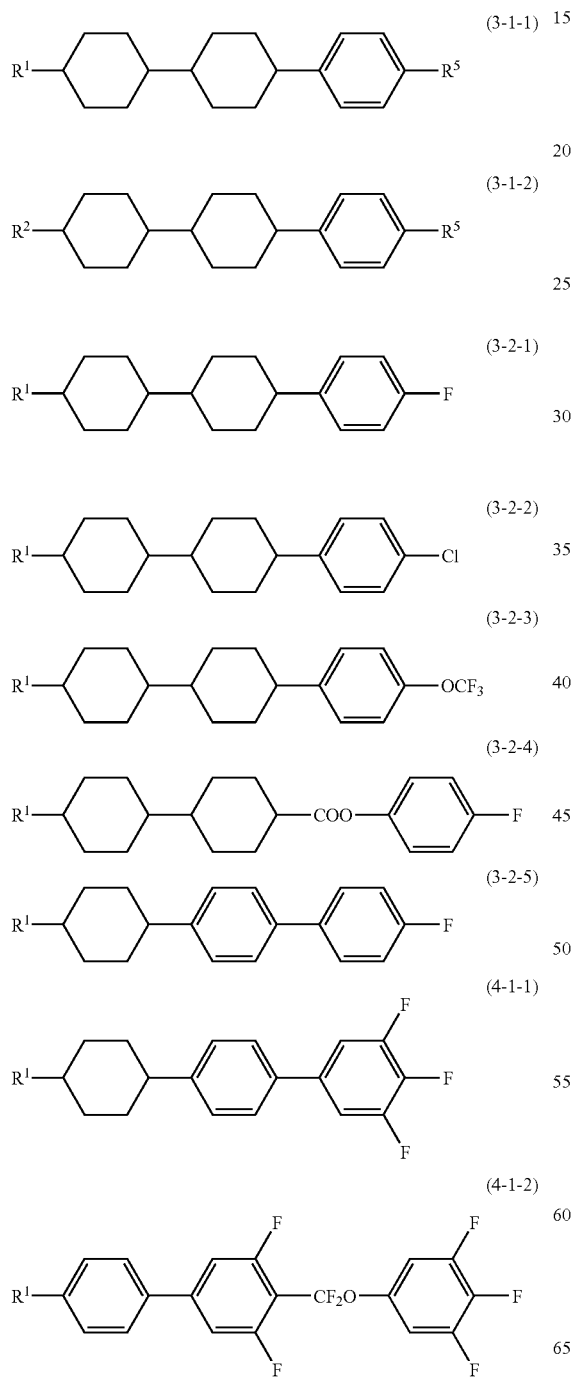

(5-1-4)
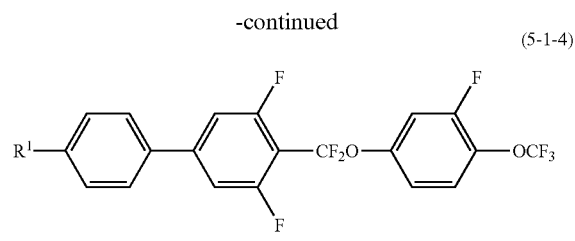
(6-1-9)
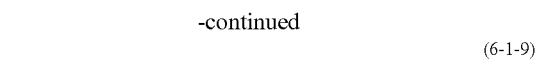
(6-1-1)
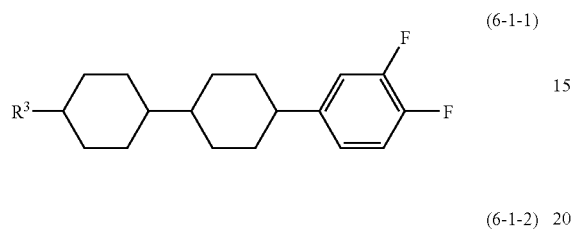
(6-1-10)
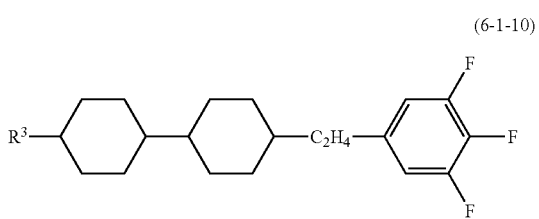
(6-1-2)
(6-1-11)
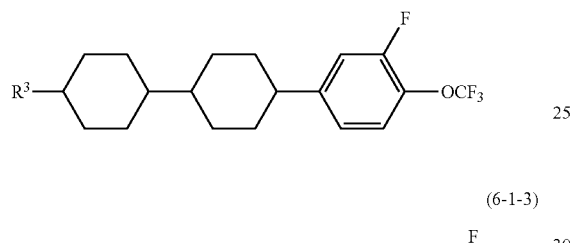
(6-1-3)
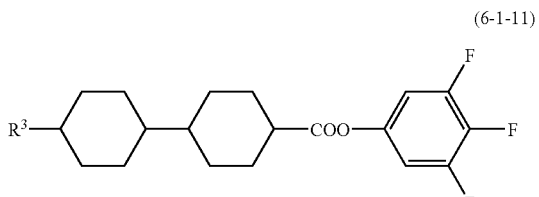
(6-1-12)
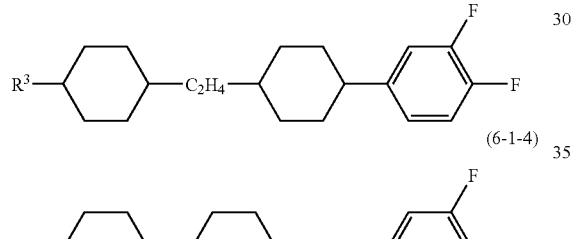
(6-1-4)
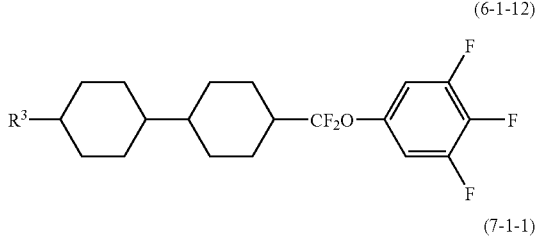
(7-1-1)
(6-1-5)
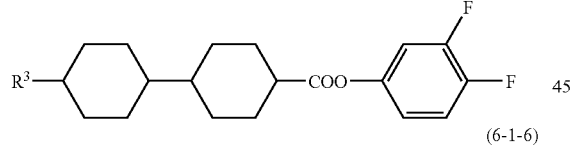
(7-1-2)
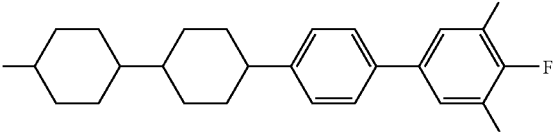
(6-1-6)
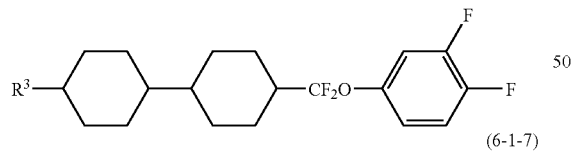
(8-1-1)
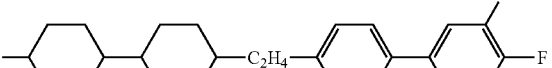
(6-1-7)
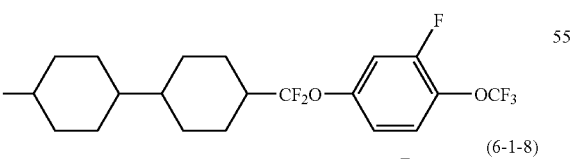
(8-1-2)
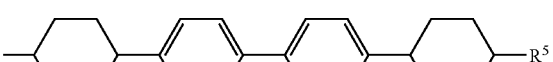
(6-1-8)
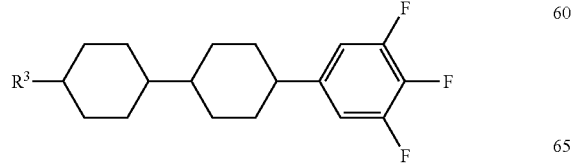
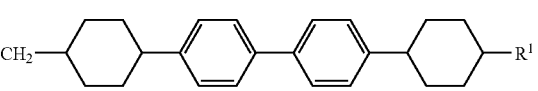

-continued (8-1-3)

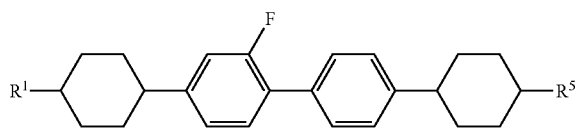

(8-1-4)

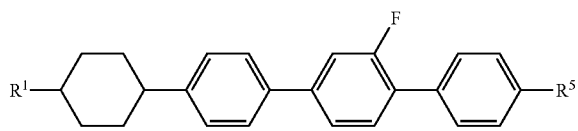

(8-1-5)

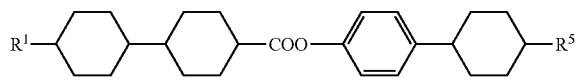

In the case where an antioxidant is added to the composition, the desirable antioxidant is the compound (9) or the compound (12).

(9)

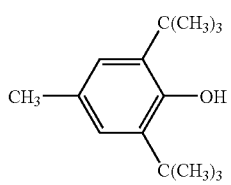

(12)

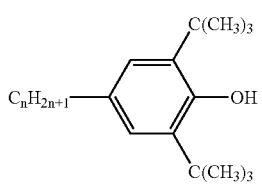

wherein n is an integer of 2 to 9. The desirable n is 3, 5, 7 or 9. The more desirable n is 7. The compound (9) is effective for preventing the specific resistance from decreasing upon heating in the air owing to the large volatility. The compound (12) where n is 7 is effective for attaining a large voltage holding ratio at not only room temperature but also high temperature after it has been used for a long time owing to the small volatility.

Sixth, the preparation methods of the component compounds will be explained. These compounds are prepared by known methods. The preparation method will be exemplified. The compound (1) is prepared according to the method described in JP S58-126823 A/1983. The compound (2) is prepared according to the method described in JP S61-27928 A/1986. The compound (3-1-1) is prepared according to the method described in JP S57-165238 A/1982. The compound (3-2-2) is prepared according to the method described in JP S57-114531 A/1982. The compound (4-1-1) is prepared according to the method described in JP H2-233626 A/1990.

The compounds (4-1-2) and (5-1-3) are prepared according to the method described in JP 2000-95715 A/2000. The compound (6-1-8) is prepared according to the method described in JP H2-233626A/1990. The compound (7-1-1) is prepared by modifying the method described in JP H2-233626 A/1990. The compound (8-1-4) is prepared according to the method described in JP H2-237949 A/1990.

The compounds where their preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.) and so forth. The compound of formula (9) is commercially available, for example, from Sigma-Aldrich Co. (US). The compound of formula (12) where n is 7 is prepared according to the method described in U.S. Pat. No. 3,660,505. The composition is prepared according to known methods of mixing the compounds thus obtained. For example, the component compounds are mixed and dissolved in each other by heating.

The composition of the invention has a lower limit temperature of mainly −30° C. or less, a higher limit temperature of mainly 70° C. or more, and an optical anisotropy in the range mainly from 0.08 to 0.12. The element including the composition has a large voltage holding ratio. Accordingly, the composition is suitable for an AM element. The composition is especially suitable for an AM element of a transmission type. By controlling the ratios of the component compounds or by further mixing with other liquid crystalline compounds, the composition having an optical anisotropy ranging from 0.07 to 0.18 may be prepared or the composition having an optical anisotropy ranging from 0.06 to 0.20 may be further prepared.

The composition can be used for an AM element and also for a PM element. The composition can be used for the elements having the modes such as PC, TN, STN, ECB, OCB, IPS, VA, and so forth. The composition is desirably used for the elements having the modes of TN, ECB, OCB or IPS. These elements may be a reflection type, a transmission type or a semi-transmission type. These elements are desirably applied to an element of a transmission type. The composition is also usable for an amorphous silicon TFT element or a polycrystalline silicon TFT element. The composition is also usable for a nematic curvilinear aligned phase (NCAP) element prepared by microcapsulating the composition, and for a polymer dispersed (PD) element in which a three dimensional net-work polymer is formed in the composition, for example, a polymer network (PN) element.

EXAMPLES

The invention will be explained in detail by way of examples. The invention is not limited by the Examples below. The compounds described in the Comparative Examples and Examples are expressed by the symbols based on the definition described in Table 5. In Table 5, the configuration of 1,4-cyclohexylene is trans. The configuration regarding a bonding group of —CH═CH— is trans. The parenthesized number next to the symbolized compounds in the Examples corresponds to the number of the desirable compound. The symbol (-) means other liquid crystalline compounds. The ratio of compounds (percentage) is percentage by weight (% by weight) based on the total weight of the composition. Finally, the characteristics of the composition are summarized.

TABLE 5

| Description of Compounds Using Symbols: R—(A₁)—Z₁—...—Zₙ—(Aₙ)—X | |
|---|---|
| | Symbol |
| 1) Left terminal R— | |
| $C_nH_{2n+1}$— | n— |
| $C_mH_{2m+1}OC_nH_{2n}$— | mOn— |
| $CH_2$=CH— | V— |
| $CH_2$=$CHC_nH_{2n}$— | Vn— |
| $C_nH_{2n+1}CH$=CH— | nV— |
| $C_nH_{2n+1}CH$=$CHC_mH_{2m}$— | nVm— |
| $CF_2$=CH— | VFF— |
| 2) Ring Structure —Aₙ— | |
|  | H |
| 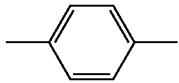 | B |
| 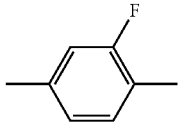 | B(F) |
| 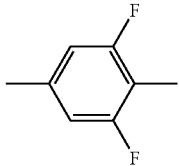 | B(F,F) |
| 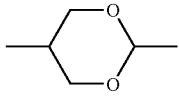 | G |
| 3) Bonding group —Zₙ— | |
| —$C_2H_4$— | 2 |
| —COO— | E |
| —$CF_2O$— | X |
| 4) Right terminal —X | |
| —$C_nH_{2n+1}$ | —n |
| —$OC_nH_{2n+1}$ | —On |
| —F | —F |
| —Cl | —CL |
| —$OCF_3$ | —OCF3 |
| —$CF_3$ | —CF3 |
| 5) Examples of Description | |

Example 1 3-HB—CL

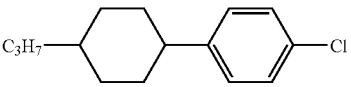

TABLE 5-continued

| Description of Compounds Using Symbols: R—(A₁)—Z₁—...—Zₙ—(Aₙ)—X | |
|---|---|
| | Symbol |

Example 2 1V—HH-3

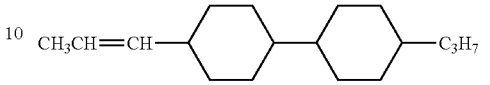

Example 3 3-BB(F,F)XB(F,F)—F

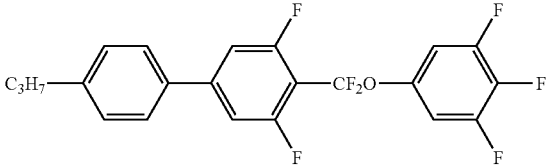

Example 4 5-HB B(F)B-2

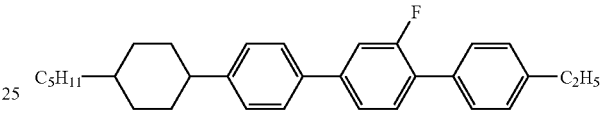

The composition is prepared by measuring the weight of the components, such as the liquid crystalline compounds, and mixing them. Therefore, the weight percentages of the components can be easily calculated. However, it is not easy to calculate the ratios of the components easily by gas chromatography analysis because the compensation coefficient depends on the kind of the liquid crystalline compound. The compensation coefficient is approximately 1. Furthermore, influence of a fluctuation by 1% by weight in the component compounds on the characteristics of the composition is small. Accordingly, in the invention, the area ratios of the component peaks in gas chromatograph can be regarded as the weight percentages of the component compounds. In other words, the results of gas chromatography analysis (area ratios of peaks) can be understood as the weight percentages of the liquid crystalline compounds without any compensation.

In the case where a sample to be measured was a composition, it was measured as it is, and resulting values were shown. In the case where a sample was a compound, the values of a higher limit temperature, an optical anisotropy, a viscosity and a dielectric anisotropy were obtained in the following manner. 15% by weight of the sample and 85% by weight of the mother liquid crystal A were mixed to prepare a sample. The characteristic value is calculated by the extrapolation method from the value obtained by the measurement. Namely: extrapolated value=((Measurement value of sample)−0.85×(Measurement value of mother crystal A))/ 0.15.

In cases where a crystal (or a smectic phase) was deposited at the ratio of the compound and the mother crystal A at 25° C., the ratio was changed to 10% by weight/90% by weight, 5% by weight/95% by weight, and 1% by weight/99% by weight, in this order. The higher limit temperature, the optical anisotropy, the viscosity and the dielectric anisotropy of the compounds were obtained by the aforementioned extrapolation method.

The mother liquid crystal A had the following composition.

| Structure | Percentage |
|---|---|
| $C_3H_7$—[Cy]—[Ph]—CN | 24% |
| $C_5H_{11}$—[Cy]—[Ph]—CN | 36% |
| $C_7H_{15}$—[Cy]—[Ph]—CN | 25% |
| $C_5H_{11}$—[Cy]—[Ph]—[Ph]—CN | 15% |

In the case where a sample was a compound, the value of a lower limit temperature was obtained in the following manner. The sample and the mother liquid crystal B were mixed to prepare a composition. The ratio of the sample was 1% by weight, 3% by weight, 5% by weight, 10% by weight, 15% by weight or 20% by weight. The composition was placed in a glass bottle and stored in a freezer at −20° C. for 30 days, and then the composition was observed as to whether it stayed at the nematic phase or was transferred to a crystal (or a smectic phase).

The mother liquid crystal B had the following composition.

| Structure | Percentage |
|---|---|
| $C_2H_5$—[Cy]—[Cy]—[Ph(3,4-F)] | 16.7% |
| $C_3H_7$—[Cy]—[Cy]—[Ph(3,4-F)] | 16.7% |
| $C_5H_{11}$—[Cy]—[Cy]—[Ph(3,4-F)] | 16.6% |
| $C_2H_5$—[Cy]—$C_2H_4$—[Cy]—[Ph(3,4-F)] | 10.0% |
| $C_3H_7$—[Cy]—$C_2H_4$—[Cy]—[Ph(3,4-F)] | 5.0% |
| $C_5H_{11}$—[Cy]—$C_2H_4$—[Cy]—[Ph(3,4-F)] | 10.0% |
| $C_2H_5$—[Cy]—[Ph]—[Ph(3,4-F)] | 6.3% |
| $C_3H_7$—[Cy]—[Ph]—[Ph(3,4-F)] | 6.3% |
| $C_5H_{11}$—[Cy]—[Ph]—[Ph(3,4-F)] | 12.4% |

The measurement of the characteristics was carried out according to the following methods. Most methods are described in EIAJ ED-2521A of the Standard of Electric Industrial Association of Japan or methods obtained by modifying them. The TN element used for the measurement had no TFT attached.

A higher limit temperature of a nematic phase (NI; °C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit temperature of a nematic phase may be abbreviated to "a higher limit temperature".

A lower limit temperature of a nematic phase (Tc; °C.): A sample having a nematic phase was kept in a freezer at temperatures of 0° C., −10° C., −20° C., −30° C., and −40° C. for ten days, respectively, and a liquid crystal phase was observed. For example, when the sample remained in a nematic phase at −20° C. and the sample changed to crystals or a smectic phase at −30° C., Tc was expressed as ≦−20° C. A lower limit temperature may be abbreviated to "a lower limit temperature".

Viscosity (η; mPa·s, measured at 20° C.): A viscosity was measured by means of an E-type viscometer.

Optical anisotropy (refractive index anisotropy; Δn; measured at 25° C.): An optical anisotropy was measured by means of an Abbe refractometer having a polarizing plate attached to the eyescope with a light having a wavelength of 589 nanometers. After rubbing the surface of the main prism in one direction, the sample was dropped on the main prism. The refractive index n ∥ was measured when the polarizing direction was in parallel to the rubbing direction. The refractive index n ⊥ was measured when the polarizing direction was perpendicular to the rubbing direction. A value of optical anisotropy was calculated from an equation:

$$\Delta n = n\| - n\bot$$

Dielectric anisotropy (Δ∈; measured at 25° C.): A sample was poured into a TN element in which the cell gap between two glass plates was 9 micrometers and a twist angle was 80 degrees. A sine wave (10 V, 1 kHz) was applied to the element, and after two seconds, a dielectric constant (∈∥) that is parallel to a liquid crystal molecule was measured. A sine wave (0.5 V, 1 kHz) was applied to the element, and after two seconds, a dielectric constant (∈⊥) that is perpendicular to a liquid crystal molecule was measured. A value of dielectric anisotropy was calculated from an equation:

Δ∈=∈∥−∈⊥

Threshold voltage (Vth; measured at 25° C.; V): Measurement was carried out by using a brightness meter, Model LCD5100, produced by Otsuka Electronics Co., Ltd. A halogen lamp was used as a light source. A sample was poured into a TN element of a normally white mode, in which a cell gap between two glass plate was 5.0 micrometers and a twist angle was 80 degrees. A voltage (32 Hz, rectangular wave) applied to the element was increased from 0 V to 10 V stepwise by 0.02 V. At this time, the element was irradiated with light in the perpendicular direction to measure the light amount transmitted through the element. A voltage-transmittance curve was prepared with the maximum light amount being 100% and the minimum light amount being 0%. The threshold voltage was designated as a voltage at which the transmittance was 90%.

Voltage holding ratio (VHR; measured at 25° C. and 100° C.; %): A TN element used for the measurement had a polyimide alignment film and the TN element's cell gap was 6 micrometers. A sample was poured into the element, which was then sealed with an adhesive that is polymerized with an ultraviolet ray. The TN element was charged by applying a pulse voltage (5V for 60 microseconds). The voltage thus attenuated was measured with a high-speed voltmeter for 16.7 milliseconds, and an area A between the voltage curve and the abscissa per unit cycle was obtained. An area where the voltage was not attenuated was designated as an area B. The voltage holding ratio was a percentage of the area A with respect to the area B. A voltage holding ratio obtained by measuring at 25° C. was expressed as VHR-1. A voltage holding ratio obtained by measuring at 100° C. was expressed as VHR-2. The TN element was then heated to 100° C. for 250 hours. A voltage holding ratio obtained by measuring at 25° C. the element after heating was expressed as VHR-3. A voltage holding ratio obtained by measuring at 100° C. the element after heating was expressed as VHR-4. VHR-4 and VHR-2 corresponded to evaluation in the initial stage. VHR-3 and VHR-4 corresponded to evaluation after using the element for a long period of time.

Response time (τ; measured at 25° C.; millisecond): Measurement was carried out by using a brightness meter, Model LCD5100, produced by Otsuka Electronics Co., Ltd. A halogen lamp was used as a light source. A low-pass filter was set at 5 kHz. A sample was poured into a TN element of a normally white mode, in which a cell gap between two glass plate was 5.0 micrometers and a twist angle was 80 degrees. A rectangular wave (60 Hz, 5 V, 0.5 second) was applied to the element. The element was irradiated with light in the perpendicular direction to measure the light amount transmitted through the element. The transmittance was 100% when the light amount was maximum, and the transmittance was 0% when the light amount was minimum. The rise time (τr) was a period of time required for changing the transmittance from 90% to 10%. The fall time (τf) was a period of time required for changing the transmittance from 10% to 90%. The response time was a sum of the rise time and the fall time thus obtained.

Gas chromatography analysis: Measurement was carried out by using a gas chromatography apparatus Model GC-14B, produced by Shimadzu Corporation. A carrier gas was helium (2 mL/min). The sample vaporizing chamber was set at 280° C., and the detector (FDI) was set at 300° C. The component compounds were separated by using a capillary column DB-1 (length: 30 m; inner diameter: 0.32 mm; membrane thickness: 0.25 μm; stationary phase: dimethylpolysiloxane; no polarity), produced by Agilent Technologies, Inc. The column was maintained at 200° C. for 2 minutes and then increased in temperature to 280° C. at a rate of 5° C. per minute. A sample was formed into an acetone solution (0.1% by weight), and 1 μL thereof was injected into the sample vaporizing chamber. A recorder was Chromatopac Model C-R$^5$A, produced by Shimadzu Corporation or an equivalent product thereof. The resulting gas chromatogram exhibited peak retention times and peak areas corresponding to the component compounds.

The solvent for diluting the sample may be chloroform, hexane and so forth. The following capillary columns may be used for separating the component compounds: HP-1 (length: 30 m; inner diameter: 0.32 mm; membrane thickness: 0.25 μm), produced by Agilent Technologies, Inc.; Rtx-1 (length: 30 m; inner diameter: 0.32 mm; membrane thickness: 0.25 μm), produced by Restek Corporation; and BP-1 (length: 30 m; inner diameter: 0.32 mm; membrane thickness: 0.25 μm), produced by SGE International Pty. Ltd. In order to prevent compound peaks from overlapping, a capillary column CBP1-M50-025 (length: 50 m; inner diameter: 0.25 mm; membrane thickness: 0.25 μm), produced by Shimadzu Corporation may be used. The area ratios of the peaks in the gas chromatogram correspond to the ratios of the component compounds. The weight percentages of the component compounds do not completely agree with the area ratios of the peaks. In the invention, however, the weight percentages of the component compounds can be regarded as being the same as the area ratios of the peaks upon using the aforementioned columns. This is because there is no large difference in compensation coefficients among the component compounds.

Comparative Example 1

Example 5 was chosen from the compositions disclosed in JP H9-59623 A/1997. The basis is that its composition includes the second component, the third component and the fourth component of the present invention, and has the shortest response time. The components and characteristics of the composition are as follows. In the composition, the lower limit temperature is high, the threshold voltage is high and the response time is long.

| | |
|---|---|
| V—HH-5 | 17.5% |
| V2-HH-3 | 17.5% |
| V—HHB-1 | 10.5% |
| V2-HHB-1 | 10.5% |
| 3-HB—O2 | 14.0% |
| 3-HBB(F,F)—F | 15.0% |
| 5-HBB(F,F)—F | 15.0% |

NI=81.3° C.; Tc≦−10° C.; Δn=0.091; η=13.2 mPa·s; Vth=2.38 V; VHR-1=99.5%; VHR-2=97.9%; τ=14.9 ms.

Comparative Example 2

Example 5 was chosen from the compositions disclosed in JP H9-71779 A/1997. The basis is that its composition has the smallest viscosity. The components and characteristics of the composition are as follows. In the composition, the viscosity is large, the threshold voltage is high and the response time is long.

| | |
|---|---|
| 5-HB—CL | 8% |
| 7-HB—CL | 5% |
| 3-HHEB(F,F)—F | 6% |
| 2-HBEB(F,F)—F | 2% |
| 3-HBEB(F,F)—F | 2% |
| 3-HH-4 | 11% |
| 3-HH-5 | 4% |
| 3-HHB-1 | 8% |
| 3-HHB—F | 4% |
| 2-HHB(F)—F | 10% |
| 3-HHB(F)—F | 11% |
| 5-HHB(F)—F | 11% |
| 2-HBB(F)—F | 4% |
| 3-HBB(F)—F | 5% |
| 5-HBB(F)—F | 9% |

NI=91.1° C.; Tc≦−40° C.; Δn=0.088; τ=17.6 mPa·s; Vth=2.08 V; VHR-1=99.4%; VHR-2=97.5%; τ=21.3 ms.

Comparative Example 3

Example 2 was chosen from the compositions disclosed in JP H11-29771 A/1999 (U.S. Pat. No. 6,045,878 A). The basis is that its composition does not include a compound having a CN group at its end, includes the second component and the fourth component of the present invention and has the smallest rotation viscosity. The components and characteristics of the composition are as follows. In the composition, the viscosity is large and the response time is long.

| | |
|---|---|
| V—HH-5 | 17% |
| 3-HB—O1 | 8% |
| 2-HHB—OCF3 | 6% |
| 3-HHB—OCF3 | 6% |
| 4-HHB—OCF3 | 6% |
| 2-HBB(F)—F | 6% |
| 3-HBB(F)—F | 3% |
| 2-HBB(F,F)—F | 9% |
| 2-HHB(F,F)—F | 8% |
| 3-HHB(F,F)—F | 9% |
| 2-HHEB(F,F)—F | 6% |
| 3-HHEB(F,F)—F | 8% |
| V—HHB(F)—F | 8% |

NI=73.6° C.; Tc≦−30° C.; Δn=0.082; η=15.8 mPa·s; Vth=1.47 V; VHR-1=99.5%; VHR-2=97.8%; τ=19.5 ms.

Comparative Example 4

Example 9 was chosen from the compositions disclosed in JP 2002-288470 A/2002 (U.S. Pat. No. 6,572,938 B2). The basis is that its composition includes the first component, the second component and the third component of the present invention. The components and characteristics of the composition are as follows. In the composition, the lower limit temperature is high, the optical anisotropy is small, the viscosity is large and the response time is long.

| | |
|---|---|
| 3-HEH-3 | 8% |
| 4-HEH-3 | 8% |
| 2-HHEH-3 | 3% |
| 3-HHEH-3 | 3% |
| 4-HHEH-3 | 3% |
| 5-HHEH-3 | 3% |
| 7-HB(F)—F | 4% |

| | |
|---|---|
| 5-HB—CL | 5% |
| 3-HEB—F | 5% |
| 5-HEB(F,F)—F | 5% |
| 3-HHB—F | 5% |
| 3-H2HB(F)—F | 4% |
| 3-HHB(F,F)—F | 4% |
| 5-HHB(F,F)—F | 4% |
| 3-HH2B(F,F)—F | 5% |
| 3-HHB—OCF3 | 3% |
| 3O1-HHB—OCF3 | 3% |
| 5-HHXB—OCF3 | 5% |
| 3-HHXB(F)—OCF3 | 5% |
| 1V2-HH-3 | 5% |
| V2-HH-4 | 5% |
| 3-HHEBH-3 | 5% |

NI=87.0° C.; Tc≦−20° C.; Δn=0.057; η=17.5 mPa·s; Vth=1.91 V; VHR-1=99.0%; VHR-2=97.7%; τ=23.1 ms.

Comparative Example 5

Example 5 was chosen from the compositions disclosed in JP 2002-285157 A/2002 (U.S. Pat. No. 6,682,784 B2). The basis is that its composition includes the first component, the second component and the third component of the present invention, and has the smallest viscosity. The components and characteristics of the composition are as follows. In the composition, the threshold voltage is large, the viscosity is large and the response time is long.

| | |
|---|---|
| 5-HB—CL | 5% |
| V—HH-5 | 6% |
| 3-HEB(F)—F | 10% |
| 3-HHEB(F)—F | 18% |
| 3-HBEB(F)—F | 10% |
| 3-HHEB—F | 4% |
| 2-HHB(F)—F | 9% |
| 3-HHB(F)—F | 9% |
| 5-HHB(F)—F | 9% |
| 2-HBB(F)—F | 8% |
| 3-HBB(F)—F | 4% |
| 5-HBB(F)—F | 8% |

NI=91.7° C.; Tc≦−30° C.; Δn=0.093; η=15.4 mPa·s; Vth=2.40 V; VHR-1=99.2%; VHR-2=97.4%; τ=16.2 ms.

Comparative Example 6

Example 6 was chosen from the compositions disclosed in JP 2003-238960 A/2003. The basis is that its composition includes the second component of the present invention, and has the smallest viscosity. The components and characteristics of the composition are as follows. In the composition, the optical anisotropy is small, the viscosity is large and the response time is long.

| | |
|---|---|
| 3-HH—CF3 | 3% |
| 5-HH—CF3 | 5% |
| 1V—HH-3 | 5% |
| V—HH-5 | 18% |
| 2-HHB(F,F)—F | 10% |
| 3-HHB(F,F)—F | 12% |
| 4-HHB(F,F)—F | 5% |
| 5-HHB(F,F)—F | 5% |
| 2-HHB(F)—OCF3 | 8% |

-continued

| | | |
|---|---|---|
| 3-HHB(F)—OCF3 | | 10% |
| 4-HHB(F)—OCF3 | | 4% |
| 5-HHB(F)—OCF3 | | 4% |
| 2-HHEB(F,F)—F | | 5% |
| 3-HHEH-3 | | 3% |
| 4-HHEH-3 | | 3% |

NI 82.2° C.; Tc≦−40° C.; Δn=0.067; η=23.6 mPa·s; Vth=1.59 V; VHR-1=99.4%; VHR-2=97.6%; τ=37.4 ms.

Comparative Example 7

Example 2 was chosen from the compositions disclosed in JP 2004-149691 A/2004 (US2004/0089844A1). The basis is that its composition includes the second component, the third component and the fourth component of the present invention. The components and characteristics of the composition are as follows. In the composition, the viscosity is large and the response time is long.

| | | |
|---|---|---|
| 5-HEB(F,F)—F | | 15% |
| 3-GHB(F,F)—F | | 3% |
| 5-GHB(F,F)—F | | 18% |
| 3-HHB(F)—F | | 8% |
| 2-HHB(F,F)—F | | 5% |
| 3-HHB(F,F)—F | | 10% |
| 3-HBB(F,F)—F | | 15% |
| 3-HH-4 | | 4% |
| V—HH-5 | | 5% |
| 3-HHB-1 | | 4% |
| 3-HHB-3 | | 3% |
| 3-HHEBH-3 | | 5% |
| 3-HHEBH-4 | | 5% |

NI=81.5° C.; Tc≦−30° C.; Δn=0.080; η=29.6 mPa·s; Vth=1.14 V; VHR-1=98.9%; VHR-2=97.4%; τ=64.1 ms.

Example 1

| | | |
|---|---|---|
| 3-HB—CL | (1) | 11% |
| V—HH-5 | (2) | 16% |
| 1V—HH-3 | (2) | 13% |
| V—HHB-1 | (3-1-2) | 19% |
| V2-HHB-1 | (3-1-2) | 10% |
| 2-HBB—F | (3-2-5) | 4% |
| 3-HBB—F | (3-2-5) | 4% |
| 5-HBB—F | (3-2-5) | 4% |
| 3-BB(F,F)XB(F,F)—F | (4-1-2) | 19% |

NI=78.3° C.; Tc≦−30° C.; Δn=0.099; η=13.0 mPa·s; Vth=1.95 V; VHR-1=99.5%; VHR-2=97.7%; τ=9.9 ms.

Example 2

| | | |
|---|---|---|
| 3-HB—CL | (1) | 17% |
| V—HH-5 | (2) | 16% |
| 1V—HH-3 | (2) | 12% |
| V—HHB-1 | (3-1-2) | 19% |
| V2-HHB-1 | (3-1-2) | 6% |
| 2-HHB—CL | (3-2-2) | 4% |
| 3-HHB—CL | (3-2-2) | 4% |
| 3-BB(F,F)XB(F,F)—F | (4-1-2) | 10% |
| 3-HHXB(F,F)—F | (6-1-12) | 12% |

NI=79.6° C.; Tc≦−30° C.; Δn=0.087; η=12.7 mPa·s; Vth=1.99 V; VHR-1=99.6%; VHR-2=97.4%; τ=9.8 ms.

Example 3

| | | |
|---|---|---|
| 3-HB—CL | (1) | 7% |
| V—HH-5 | (2) | 17% |
| V—HH-3 | (2) | 10% |
| V—HHB-1 | (3-1-2) | 18% |
| V2-HHB-1 | (3-1-2) | 8% |
| 3-HHB—CL | (3-2-2) | 6% |
| 5-HHB—CL | (3-2-2) | 3% |
| 3-BB(F,F)XB(F,F)—F | (4-1-2) | 21% |
| 2-HHB(F,F)—F | (6-1-8) | 10% |

NI=76.2° C.; Tc≦−30° C.; Δn=0.090; η=13.0 mPa·s; Vth=1.57 V; VHR-1=99.5%; VHR-2=97.6%; τ=12.3 ms.

Example 4

| | | |
|---|---|---|
| 3-HB—CL | (1) | 10% |
| V—HH-5 | (2) | 20% |
| 1V—HH-3 | (2) | 10% |
| V—HHB-1 | (3-1-2) | 16% |
| V2-HHB-1 | (3-1-2) | 5% |
| 2-HBB—F | (3-2-5) | 3% |
| 3-HBB—F | (3-2-5) | 3% |
| 5-HBB—F | (3-2-5) | 3% |
| 3-HBB(F,F)—F | (4-1-1) | 5% |
| 3-BB(F,F)XB(F,F)—F | (4-1-2) | 22% |
| 3-HHBB(F,F)—F | (7-1-1) | 3% |

NI=71.4° C.; Tc≦−30° C.; Δn=0.099; η=13.1 mPa·s; Vth=1.65 V; VHR-1=99.5%; VHR-2=97.5%; τ=11.7 ms.

Example 5

| | | |
|---|---|---|
| 3-HB—CL | (1) | 14% |
| V—HH-5 | (2) | 32% |
| 3-HHB-1 | (3-1-1) | 3% |
| 3-HHB-3 | (3-1-1) | 3% |
| 3-HHB—F | (3-2-1) | 3% |
| 2-HHB—CL | (3-2-2) | 5% |
| 3-HHB—CL | (3-2-2) | 5% |
| 5-HHB—CL | (3-2-2) | 5% |
| 2-HBB—F | (3-2-5) | 3% |
| 3-HBB—F | (3-2-5) | 3% |
| 5-HBB—F | (3-2-5) | 3% |
| 3-BB(F,F)XB(F,F)—F | (4-1-2) | 16% |
| 5-HBB(F)B-2 | (8-1-4) | 5% |

NI=78.4° C.; Tc≦−30° C.; Δn=0.099; η=13.3 mPa·s; Vth=1.96 V; VHR-1=99.3%; VHR-2=97.4%; τ=11.1 ms.

Example 6

| | | |
|---|---|---|
| 3-HB—CL | (1) | 6% |
| V—HH-3 | (2) | 39% |
| 1V—HH-3 | (2) | 6% |
| V—HHB-1 | (3-1-2) | 5% |
| 2-HBB—F | (3-2-5) | 5% |
| 3-HBB—F | (3-2-5) | 5% |
| 5-HBB—F | (3-2-5) | 5% |
| 3-BB(F,F)XB(F,F)—F | (4-1-2) | 20% |
| 5-HBB(F)B-2 | (8-1-4) | (8-1-4) |
| 5-HBB(F)B-3 | (8-1-4) | 4% |

NI=71.3° C.; Tc≦−30° C.; Δn=0.099; η=9.4 mPa·s; Vth=1.82 V; VHR-1=99.4%; VHR-2=97.3%; τ=9.9 ms.

Example 7

| | | |
|---|---|---|
| 3-HB—CL | (1) | 15% |
| V—HH-3 | (2) | 35% |
| V—HHB-1 | (3-1-2) | 3% |
| 2-HBB—F | (3-2-5) | 5% |
| 3-HBB—F | (3-2-5) | 5% |
| 5-HBB—F | (3-2-5) | 5% |
| 3-BB(F,F)XB(F,F)—F | (4-1-2) | 18% |
| 5-HBB(F)B-2 | (8-1-4) | 7% |
| 5-HBB(F)B-3 | (8-1-4) | 7% |

NI=71.0° C.; Tc≦−30° C.; Δn=0.110; η=10.8 mPa·s; Vth=1.89 V; VHR-1=99.5%; VHR-2=97.2%; τ=9.8 ms.

Example 8

| | | |
|---|---|---|
| 3-HB—CL | (1) | 7% |
| 1V—HH-3 | (2) | 10% |
| V—HH-5 | (2) | 23% |
| V—HHB-1 | (3-1-2) | 14% |
| V2-HHB-1 | (3-1-2) | 6% |
| 3-HBB(F,F)—F | (4-1-1) | 8% |
| 3-BB(F,F)XB(F,F)—F | (4-1-2) | 16% |
| 3-HHB(F,F)—F | (6-1-8) | 10% |
| 3-HHBB(F,F)—F | (7-1-1) | 6% |

NI=80.4° C.; Tc≦−30° C.; Δn=0.093; η=12.2 mPa·s; Vth=1.62 V; VHR-1=99.6%; VHR-2=97.7%; τ=12.3 ms.

Example 9

| | | |
|---|---|---|
| 3-HB—CL | (1) | 8% |
| 1V—HH-3 | (2) | 10% |
| V—HH-5 | (2) | 20% |
| V—HHB-1 | (3-1-2) | 13% |
| V2-HHB-1 | (3-1-2) | 6% |
| 3-HBB—F | (3-2-5) | 4% |
| 3-HBB(F,F)—F | (4-1-1) | 8% |
| 3-BB(F,F)XB(F,F)—F | (4-1-2) | 15% |
| 3-HHB(F,F)—F | (6-1-8) | 10% |
| 3-HHBB(F,F)—F | (7-1-1) | 6% |

NI=81.3° C.; Tc≦−30° C.; Δn=0.096; η=11.7 mPa·s; Vth=1.74 V; VHR-1=99.6%; VHR-2=97.4%; τ=11.8 ms.

Example 10

| | | |
|---|---|---|
| 3-HB—CL | (1) | 7% |
| V—HH-5 | (2) | 20% |
| 1V—HH-3 | (2) | 13% |
| V—HHB-1 | (3-1-2) | 18% |
| V2-HHB-1 | (3-1-2) | 6% |
| 3-HHB—CL | (3-2-2) | 5% |
| 3-BB(F,F)XB(F,F)—F | (4-1-2) | 21% |
| 2-HHB(F,F)—F | (6-1-8) | 5% |
| 3-HHBB(F,F)—F | (7-1-1) | 5% |

100 ppm of the compound (9) as an antioxidant was added to the composition. The characteristics of the composition thus obtained were as follows: NI=82.5° C.; Tc≦−30° C.; Δn=0.095; η=13.7 mPa·s; Vth=1.71 V; VHR-1=99.5%; VHR-2=97.3%; τ=11.9 ms.

Example 11

| | | |
|---|---|---|
| 3-HB—CL | (1) | 11% |
| V—HH-5 | | 16% |
| 1V—HH-3 | (2) | 13% |
| V—HHB-1 | (3-1-2) | 19% |
| V2-HHB-1 | (3-1-2) | 10% |
| 3-HHB—OCF3 | (3-2-3) | 2% |
| 3-HHEB—F | (3-2-4) | 2% |
| 2-HBB—F | (3-2-5) | 4% |
| 3-HBB—F | (3-2-5) | 4% |
| 3-BB(F,F)XB(F,F)—F | (4-1-2) | 13% |
| 3-HB(F,F)XB(F,F)—F | (4-1-6) | 3% |
| 3-BB(F,F)XB(F)-OCF3 | (5-1-4) | 3% |

NI=79.8° C.; Tc≦−30° C.; Δn=0.096; η=12.9 mPa·s; Vth=1.99 V; VHR-1=99.4%; VHR-2=97.4%; τ=9.7 ms.

Example 12

| | | |
|---|---|---|
| 3-HB—CL | (1) | 7% |
| 1V—HH-3 | (2) | 10% |
| V—HH-5 | (2) | 23% |
| V—HHB-1 | (3-1-2) | 14% |
| V2-HHB-1 | (3-1-2) | 6% |
| 3-HBB(F,F)—F | (4-1-1) | 4% |
| 3-BB(F,F)XB(F,F)—F | (4-1-2) | 16% |
| 3-H2BB(F,F)—F | (4-1-3) | 2% |
| 3-HBEB(F,F)—F | (4-1-4) | 2% |
| 3-HHB(F,F)—F | (6-1-8) | 5% |
| 3-H2HB(F,F)—F | (6-1-9) | 3% |
| 3-HH2B(F,F)—F | (6-1-10) | 2% |
| 3-HHBB(F,F)—F | (7-1-1) | 3% |
| 3-HH2BB(F,F)—F | (7-1-2) | 3% |

NI=80.8° C.; Tc≦−30° C.; Δn=0.093; η=12.8 mPa·s; Vth=1.68 V; VHR-1=99.3%; VHR-2=97.8%; τ=11.3 ms.

Example 13

| | | |
|---|---|---|
| 3-HB—CL | (1) | 15% |
| V—HH-3 | (2) | 35% |

-continued

| | | |
|---|---|---|
| V—HHB-1 | (3-1-2) | 3% |
| 2-HBB—F | (3-2-5) | 5% |
| 3-HBB—F | (3-2-5) | 5% |
| 5-HBB—F | (3-2-5) | 5% |
| 3-BB(F,F)XB(F,F)—F | (4-1-2) | 18% |
| 1O1-HBBH-5 | (8-1-2) | 2% |
| 5-HB(F)BH-3 | (8-1-3) | 3% |
| 5-HBB(F)B-2 | (8-1-4) | 7% |
| 3-HHEBH-4 | (8-1-5) | 2% |

NI=71.2° C.; Tc≦−30° C.; Δn=0.104; η=11.1 mPa·s; Vth=1.88 V; VHR-1=99.6%; VHR-2=97.4%; τ=10.1 ms.

Example 14

| | | |
|---|---|---|
| 3-HB—CL | (1) | 7% |
| 1V—HH-3 | (2) | 10% |
| V—HH-5 | (2) | 23% |
| V—HHB-1 | (3-1-2) | 14% |
| V2-HHB-1 | (3-1-2) | 6% |
| 3-HBB(F,F)—F | (4-1-1) | 8% |
| 3-BB(F,F)XB(F,F)—F | (4-1-2) | 16% |
| V—HHB(F)—F | (6-1-1) | 3% |
| 3-HHB(F)—OCF3 | (6-1-2) | 2% |
| 3-HHEB(F,F)—F | (6-1-11) | 5% |
| 3-HHBB(F,F)—F | (7-1-1) | 6% |

NI=82.7° C.; Tc≦−30° C.; Δn=0.094; η=11.7 mPa·s; Vth=1.67 V; VHR-1=99.5%; VHR-2=97.3%; τ=10.4 ms.

Example 15

| | | |
|---|---|---|
| 3-HB—CL | (1) | 11% |
| V—HH-5 | (2) | 16% |
| 1V—HH-3 | (2) | 13% |
| V—HHB-1 | (3-1-2) | 17% |
| V2-HHB-1 | (3-1-2) | 10% |
| 2-HBB—F | (3-2-5) | 4% |
| 3-HBB—F | (3-2-5) | 4% |
| 5-HBB—F | (3-2-5) | 4% |
| 3-BB(F,F)XB(F,F)—F | (4-1-2) | 19% |
| VFF—HHB-1 | (—) | 2% |

NI=78.5° C.; Tc≦−30° C.; Δn=0.099; η=13.2 mPa·s; Vth=1.94 V; VHR-1=99.6%; VHR-2=97.4%; τ=10.2 ms.

Example 16

| | | |
|---|---|---|
| 3-HB—CL | (1) | 10% |
| V—HH-5 | (2) | 20% |
| 1V—HH-3 | (2) | 10% |
| V—HHB-1 | (3-1-2) | 14% |
| V2-HHB-1 | (3-1-2) | 5% |
| 2-HBB—F | (3-2-5) | 3% |
| 3-HBB—F | (3-2-5) | 3% |
| 5-HBB—F | (3-2-5) | 3% |
| 3-HBB(F,F)—F | (4-1-1) | 5% |
| 3-BB(F,F)XB(F,F)—F | (4-1-2) | 22% |
| 3-HHBB(F,F)—F | (7-1-1) | 3% |
| VFF—HHB-1 | (—) | 2% |

NI=71.6° C.; Tc≦−30° C.; Δn=0.101; η=13.3 mPa·s; Vth=1.67 V; VHR-1=99.5%; VHR-2=97.3%; τ=11.8 ms.

Example 17

| | | |
|---|---|---|
| 3-HB—CL | (1) | 17% |
| V—HH-5 | (2) | 16% |
| 1V—HH-3 | (2) | 12% |
| V—HHB-1 | (3-1-2) | 19% |
| V2-HHB-1 | (3-1-2) | 6% |
| 2-HHB—CL | (3-2-2) | 4% |
| 3-HHB—CL | (3-2-2) | 4% |
| 3-BB(F,F)XB(F,F)—F | (4-1-2) | 10% |
| 3-HHXB(F,F)—F | (6-1-12) | 12% |

200 ppm of the compound of formula (12) where n is 7 was added to the composition. The characteristics of the composition thus obtained were as follows: NI=79.6° C.; Tc≦−30° C.; Δn=0.087; η=12.7 mPa·s; Vth=1.99 V; VHR-1=99.6%; VHR-2=97.4%; τ=9.8 ms.

The effect of the combination of the compound (1) and the compound (2) in the composition can be understood from the comparison between Comparative Example 1 and Examples 1 to 17. The composition of Comparative Example 1 includes a large amount of the compound (2) but does not include the compound (1). The composition of Comparative Example 1 had a high lower limit temperature. The lower limit temperature of the composition was decreased by mixing the compound (1) and the compound (2) as shown in Examples 1 to 17.

What is claimed is:

1. A liquid crystal composition comprising at least one compound selected from a group of compounds represented by formula (1) as a first component, at least one compound selected from a group of compounds represented by formula (2) as a second component, at least one compound selected from a group of compounds represented by formula (3) as a third component, and at least one compound selected from a group of compounds represented by formula (4) and formula (5) as a fourth component:

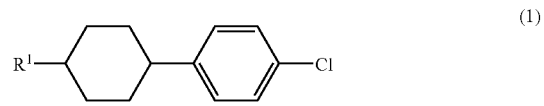

(1)

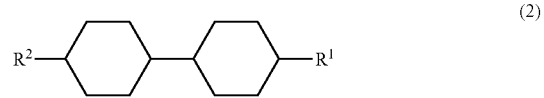

(2)

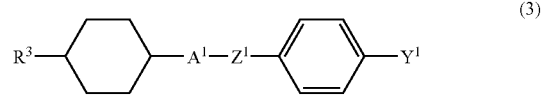

(3)

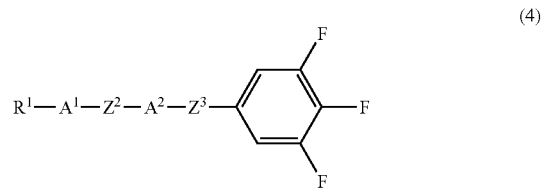

(4)

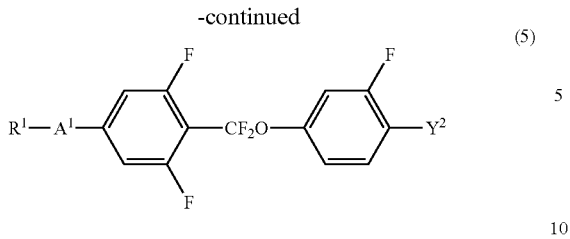

wherein $R^1$ is alkyl; $R^2$ is alkenyl; $R^3$ is alkyl or alkenyl; $A^1$ is 1,4-cyclohexylene or 1,4-phenylene; $A^2$ is 1,4-phenylene or 2,6-difluoro-1,4-phenylene; $Z^1$ is a single bond or —COO—; $Z^2$ is a single bond or —(CH$_2$)$_2$—; $Z^3$ is a single bond, —COO— or —CF$_2$O—; $Y^1$ is alkyl, fluorine, chlorine or —OCF$_3$; and $Y^2$ is fluorine or —OCF$_3$.

2. The liquid crystal composition according to claim 1, wherein the fourth component is at least one compound selected from the group of compounds represented by formula (4).

3. The liquid crystal composition according to claim 1, wherein the first component is in the range from approximately 5% to approximately 30% by weight, wherein the second component is in the range from approximately 20% to approximately 55% by weight, wherein the third component is in the range from approximately 10% to approximately 55% by weight, wherein the fourth component is in the range from approximately 5% to approximately 40% by weight, and wherein each range is based on the total weight of the liquid crystal composition.

4. The liquid crystal composition according to claim 2, wherein the first component is in the range from approximately 5% to approximately 30% by weight, wherein the second component is in the range from approximately 20% to approximately 55% by weight, wherein the third component is in the range from approximately 10% to approximately 55% by weight, wherein the fourth component is in the range from approximately 5% to approximately 40% by weight, and wherein each range is based on the total weight of the liquid crystal composition.

5. A liquid crystal composition comprising at least one compound selected from a group of compounds represented by formula (1) as a first component, at least one compound selected from a group of compounds represented by formula (2) as a second component, at least one compound selected from a group of compounds represented by formula (3-1) and formula (3-2) as a third component, and at least one compound selected from a group of compounds represented by formula (4-1) as a fourth component:

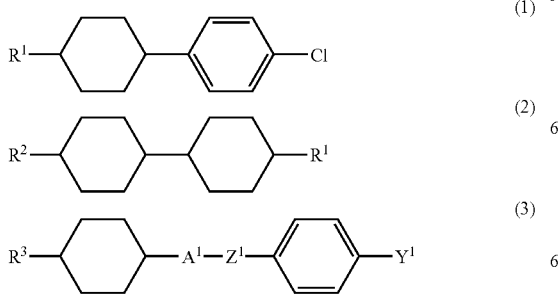

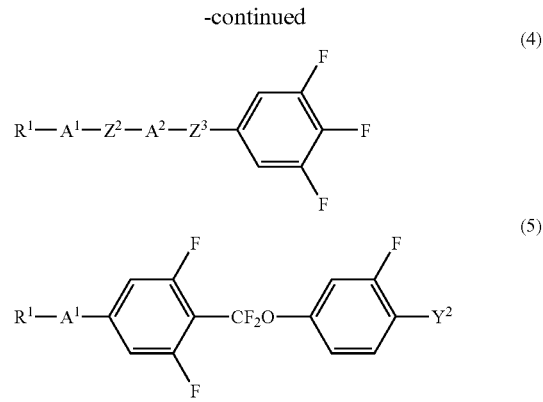

wherein $R^1$ is alkyl; $R^2$ is alkenyl; $R^3$ is alkyl or alkenyl; $A^1$ is 1,4-cyclohexylene or 1,4-phenylene; $A^2$ is 1,4-phenylene or 2,6-difluoro-1,4-phenylene; $Z^5$ is a single bond or —CF$_2$O—; and $Y^3$ is fluorine or chlorine.

6. The liquid crystal composition according to claim 5, wherein the third component is at least one compound selected from the group of compounds represented by formula (3-1).

7. The liquid crystal composition according to claim 5, wherein the third component is at least one compound selected from the group of compounds represented by formula (3-1) and at least one compound selected from the group of compounds represented by formula (3-2).

8. The liquid crystal composition according to claim 5, wherein the first component is in the range from approximately 5% to approximately 30% by weight, wherein the second component is in the range from approximately 20% to approximately 55% by weight, wherein the third component is in the range from approximately 10% to approximately 55% by weight, wherein the fourth component is in the range from approximately 5% to approximately 40% by weight, and wherein each range is based on the total weight of the liquid crystal composition.

9. The liquid crystal composition according to claim 6, wherein the first component is in the range from approximately 5% to approximately 30% by weight, the second component is in the range from approximately 20% to approximately 55% by weight, the third component is in the range from approximately 10% to approximately 55% by weight, and the fourth component is in the range from approximately 5% to approximately 40% by weight, wherein each range is based on the total weight of the liquid crystal composition.

10. The liquid crystal composition according to claim 7, wherein the first component is in the range from approximately 5% to approximately 30% by weight, wherein the second component is in the range from approximately 20% to approximately 55% by weight, wherein the third component is in the range from approximately 10% to approximately 55% by weight, wherein the fourth component is in the range from approximately 5% to approximately 40% by weight, and wherein each range is based on the total weight of the liquid crystal composition.

11. A liquid crystal composition comprising at least one compound selected from a group of compounds represented by formula (1) as a first component, at least one compound selected from a group of compounds represented by formula (2) as a second component, at least one compound selected from a group of compounds represented by formula (3-1) and formula (3-2) as a third component, and at least one compound selected from a group of compounds represented by formula (4-1-1) and formula (4-1-2) as a fourth component:

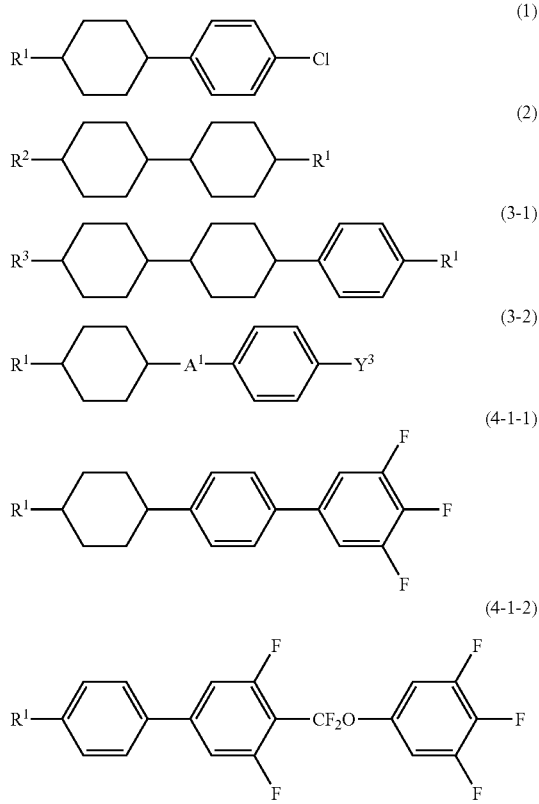

wherein $R^1$ is alkyl; $R^2$ is alkenyl; $R^3$ is alkyl or alkenyl; $A^1$ is 1,4-cyclohexylene or 1,4-phenylene; and $Y^3$ is fluorine or chlorine.

12. The liquid crystal composition according to claim 11, wherein the third component is at least one compound selected from the group of compounds represented by formula (3-1).

13. The liquid crystal composition according to claim 11, wherein the third component is at least one compound selected from the group of compounds represented by formula (3-1) and at least one compound selected from the group of compounds represented by formula (3-2).

14. The liquid crystal composition according to claim 11, wherein the fourth component is at least one compound selected from the group of compounds represented by formula (4-1-2).

15. The liquid crystal composition according to claim 12, wherein the fourth component is at least one compound selected from the group of compounds represented by formula (4-1-2).

16. The liquid crystal composition according to claim 13, wherein the fourth component is at least one compound selected from the group of compounds represented by formula (4-1-2).

17. The liquid crystal composition according to claim 11, wherein the fourth component is at least one compound selected from the group of compounds represented by formula (4-1-1) and at least one compound selected from the group of compounds represented by formula (4-1-2).

18. The liquid crystal composition according to claim 11, wherein the first component is in the range from approximately 5% to approximately 30% by weight, wherein the second component is in the range from approximately 20% to approximately 55% by weight, wherein the third component is in the range from approximately 10% to approximately 55% by weight, wherein the fourth component is in the range from approximately 5% to approximately 40% by weight, and wherein each range is based on the total weight of the liquid crystal composition.

19. The liquid crystal composition according to claim 14, wherein the first component is in the range from approximately 5% to approximately 30% by weight, wherein the second component is in the range from approximately 20% to approximately 55% by weight, wherein the third component is in the range from approximately 10% to approximately 55% by weight, wherein the fourth component is in the range from approximately 5% to approximately 40% by weight, and wherein each range is based on the total weight of the liquid crystal composition.

20. The liquid crystal composition according to claim 11 wherein the liquid crystal composition further comprises at least one compound selected from a group of compounds represented by formula (6), formula (7) and formula (8) as a fifth component:

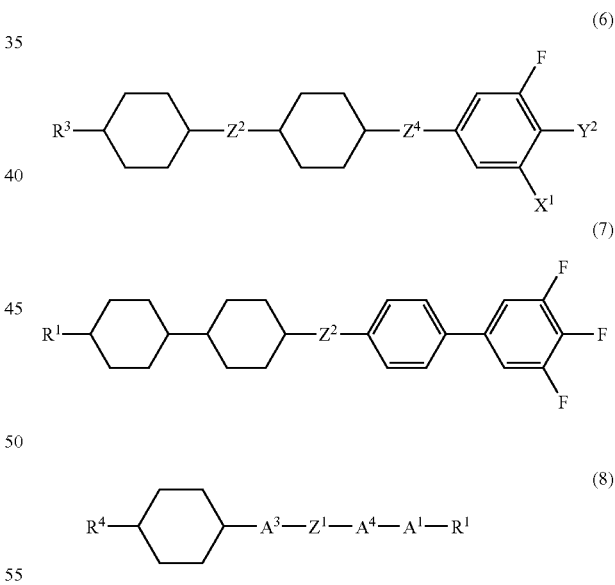

wherein $R^1$ is alkyl; $R^3$ is alkyl or alkenyl; $R^4$ is alkyl or alkoxymethyl; $A^1$ is 1,4-cyclohexylene or 1,4-phenylene; $A^3$ is 1,4-cyclohexylene, 1,4-phenylene or 2-fluoro-1,4-phenylene; $A^4$ is 1,4-phenylene or 2-fluoro-1,4-phenylene; $Z^1$ is a single bond or —COO—; $Z^2$ is a single bond or —(CH$_2$)$_2$—; $Z^4$ is a single bond, —(CH$_2$)$_2$—, —COO— or —CF$_2$O—; $X^1$ is hydrogen or fluorine; and $Y^2$ is fluorine or —OCF$_3$, and the fifth component is in the range from approximately 1% to approximately 30% by weight based on the total weight of the liquid crystal composition.

21. The liquid crystal composition according to claim 14, wherein the liquid crystal composition further comprises at least one compound selected from a group of compounds represented by formula (6), formula (7) and formula (8) as a fifth component:

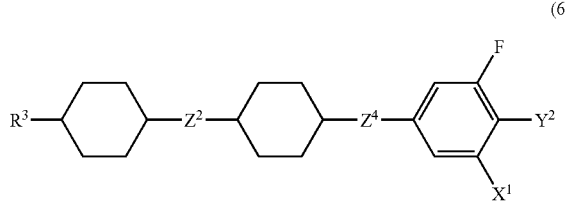

(6)

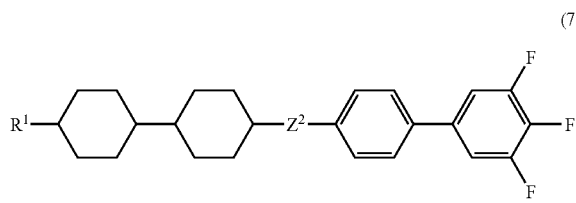

(7)

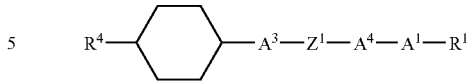

(8)

wherein $R^1$ is alkyl; $R^3$ is alkyl or alkenyl; $R^4$ is alkyl or alkoxymethyl; $A^1$ is 1,4-cyclohexylene or 1,4-phenylene; $A^3$ is 1,4-cyclohexylene, 1,4-phenylene or 2-fluoro-1,4-phenylene; $A^4$ is 1,4-phenylne or 2-fluoro-1,4-phenylene; $Z^1$ is a single bond or —COO—; $Z^2$ is a single bond or —(CH$_2$)$_2$—; $Z^4$ is a single bond, —(CH$_2$)$_2$—, —COO— or —CF$_2$O—; $X^{is}$ hydrogen or fluorine; and $Y^2$ is fluorine or —OCF$_3$, and the fifth component is in the range from approximately 1% to approximately 30% by weight based on the total weight of the liquid crystal composition.

22. The liquid crystal composition according to claim 19, wherein the liquid crystal composition further comprises at least one compound selected from a group of compounds represented by formula (6), formula (7) and formula (8) as a fifth component:

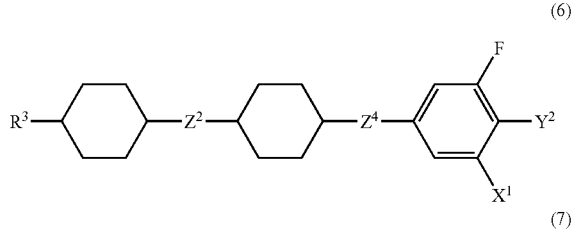

(6)

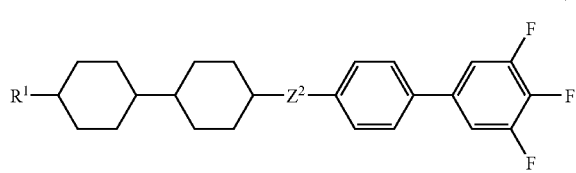

(7)

-continued

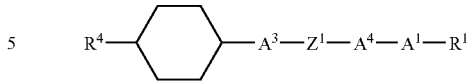

(8)

wherein $R^1$ is alkyl; $R^3$ is alkyl or alkenyl; $R^4$ is alkyl or alkoxymethyl; $A^1$ is 1,4-cyclohexylene or 1,4-phenylene; $A^3$ is 1,4-cyclohexylene, 1,4-phenylene or 2-fluoro-1,4-phenylene; $A^4$ is 1,4-phenylne or 2-fluoro-1,4-phenylene; $Z^1$ is a single bond or —COO—; $Z^2$ is a single bond or —(CH$_2$)$_2$—; $Z^4$ is a single bond, —(CH$_2$)$_2$—, —COO— or —CF$_2$O—; $X^1$ is hydrogen or fluorine; and $Y^2$ is fluorine or —OCF$_3$, and the fifth component is in the range from approximately 1% to approximately 30% by weight based on the total weight of the liquid crystal composition.

23. The liquid crystal composition according to claim 11 wherein the liquid crystal composition further comprises at least one compound selected from a group of compounds represented by formula (6-1), formula (7-1) and formula (8-1):

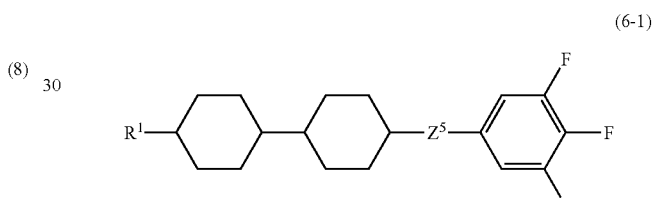

(6-1)

(7-1)

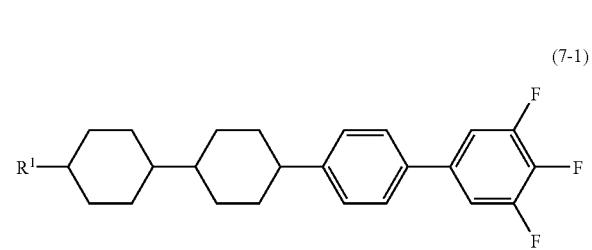

(8-1)

wherein $R^1$ and $R^5$ are independently alkyl; and $Z^5$ is a single bond or —CF$_2$O—, and the fifth component is in the range from approximately 1% to approximately 30% by weight based on the total weight of the liquid crystal composition.

24. The liquid crystal composition according to claim 14, wherein the liquid crystal composition further comprises at least one compound selected from a group of compounds represented by formula (6-1), formula (7-1) and formula (8-1):

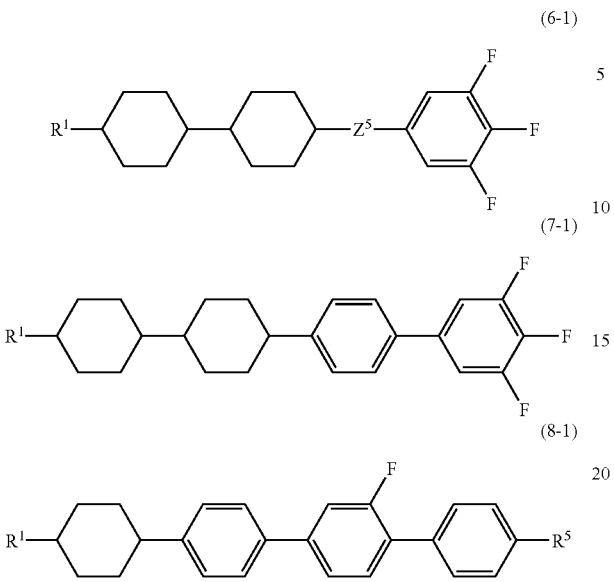

(6-1)

(7-1)

(8-1)

wherein $R^1$ and $R^5$ are independently alkyl; and $Z^5$ is a single bond or —$CF_2O$—, and the fifth component is in the range from approximately 1% to approximately 30% by weight based on the total weight of the liquid crystal composition.

25. The liquid crystal composition according to claim 19, wherein the liquid crystal composition further comprises at least one compound selected from a group of compounds represented by formula (6-1), formula (7-1) and formula (8-1):

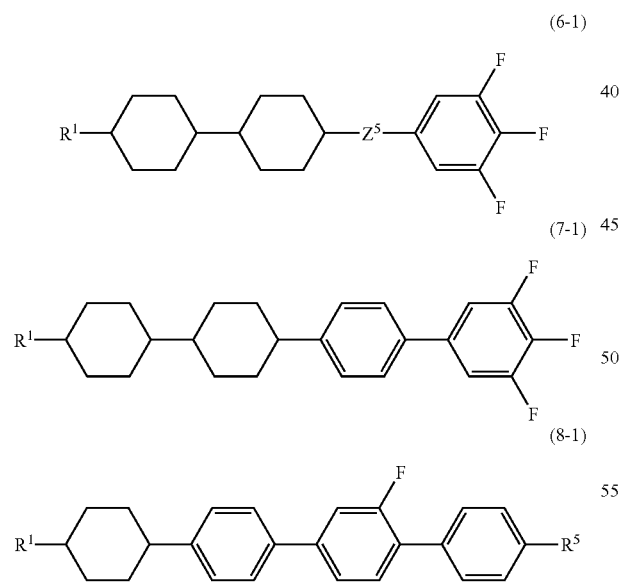

(6-1)

(7-1)

(8-1)

wherein $R^1$ and $R^5$ are independently alkyl; and $Z^5$ is a single bond or —$CF_2O$—, and the fifth component is in the range from approximately 1% to approximately 30% by weight based on the total weight of the liquid crystal composition.

26. The liquid crystal composition according to claim 1 wherein the liquid crystal composition further comprises an antioxidant.

27. The liquid crystal composition according to claim 19, wherein the liquid crystal composition further comprises an antioxidant.

28. The liquid crystal composition according to claim 26, wherein the antioxidant is at least one compound selected from a group of compounds represented by formula (9):

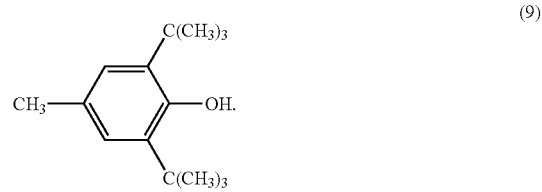

(9)

29. The liquid crystal composition according to claim 27, wherein the antioxidant is at least one compound selected from a group of compounds represented by formula (9):

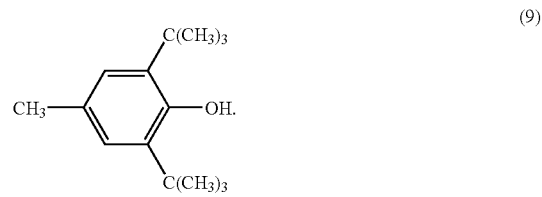

(9)

30. The liquid crystal composition according to claim 26, wherein the antioxidant is at least one compound selected from a group of compounds represented by formula (12):

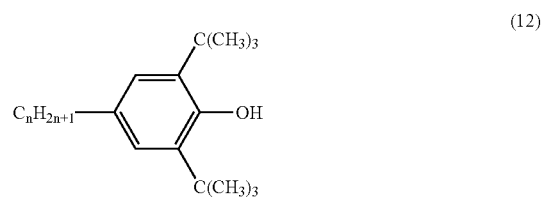

(12)

wherein n is an integer of 2 to 9.

31. The liquid crystal composition according to claim 27, wherein the antioxidant is at least one compound selected from a group of compounds represented by formula (12):

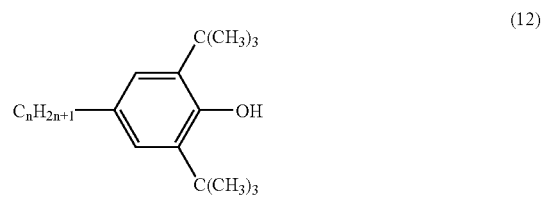

(12)

wherein n is an integer of 2 to 9.

32. The liquid crystal composition according to claim 28 wherein the antioxidant is in the range from approximately 50 ppm to approximately 600 ppm based on the total weight of the liquid crystal composition.

33. The liquid crystal composition according to claim 29, wherein the antioxidant is in the range from approximately 50 ppm to approximately 600 ppm based on the total weight of the liquid crystal composition.

34. The liquid crystal composition according to claim 30, wherein the antioxidant is in the range from approximately 50 ppm to approximately 600 ppm based on the total weight of the liquid crystal composition.

35. The liquid crystal composition according to claim 31, wherein the antioxidant is in the range from approximately 50 ppm to approximately 600 ppm based on the total weight of the liquid crystal composition.

36. A liquid crystal display element comprising the liquid crystal composition according to claim 1.

37. A liquid crystal display element comprising the liquid crystal composition according to claim 19.

* * * * *